(12) United States Patent
Iwahori

(10) Patent No.: US 9,000,711 B2
(45) Date of Patent: Apr. 7, 2015

(54) POWER CONVERTER

(75) Inventor: Michio Iwahori, Hino (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 305 days.

(21) Appl. No.: 13/577,905

(22) PCT Filed: Jan. 25, 2011

(86) PCT No.: PCT/JP2011/000391
§ 371 (c)(1),
(2), (4) Date: Sep. 17, 2012

(87) PCT Pub. No.: WO2011/102082
PCT Pub. Date: Aug. 25, 2011

(65) Prior Publication Data
US 2013/0002186 A1    Jan. 3, 2013

(30) Foreign Application Priority Data

Feb. 17, 2010   (JP) ................. 2010-032847

(51) Int. Cl.
*H02P 27/04* (2006.01)
*H02M 5/458* (2006.01)
*B60L 11/12* (2006.01)
*B60L 15/00* (2006.01)
*H02M 1/32* (2007.01)
*H02P 27/08* (2006.01)

(52) U.S. Cl.
CPC .......... *H02M 5/4585* (2013.01); *B60L 11/123* (2013.01); *B60L 15/007* (2013.01); *B60L 2210/20* (2013.01); *H02M 1/32* (2013.01); *H02P 27/08* (2013.01); *Y02T 10/6217* (2013.01); *Y02T 10/644* (2013.01); *Y02T 10/7077* (2013.01); *Y02T 10/725* (2013.01)

(58) Field of Classification Search
USPC .................. 318/139, 800, 801, 803
See application file for complete search history.

(56) References Cited

U.S. PATENT DOCUMENTS 5,719,486 A * 2/1998 Taniguchi et al. .............. 322/28
5,942,818 A * 8/1999 Satoh et al. ..................... 310/46
6,819,007 B2 * 11/2004 Fukaya ..................... 290/40 C (Continued)

FOREIGN PATENT DOCUMENTS

JP    2000-217393 A    8/2000
JP    2003-116280 A    4/2003

(Continued)

OTHER PUBLICATIONS

Japanese Patent Office, "Notice of Reasons for Refusal", Oct. 29, 2013.

*Primary Examiner* — Rina Duda
(74) *Attorney, Agent, or Firm* — Rabin & Berdo, P.C.

(57) ABSTRACT

Provided is a power converter that is capable of ensuring a conduction current without expanding the configuration of a DC voltage conversion circuit such as a DC chopper. Power can be supplied from both a DC chopper and a voltage source rectifier converting AC power into DC power, to a voltage source inverter. The voltage source rectifier has an upper arm part and a lower arm part having switching elements. The voltage source rectifier converts AC power obtained from an alternator into DC power, performs a DC chopper operation using the upper and lower arms thereof and a winding wire of the alternator, and supplies power of a DC power source to the voltage source inverter.

20 Claims, 23 Drawing Sheets

(56) References Cited

U.S. PATENT DOCUMENTS

| | | |
|---|---|---|
| 7,057,376 B2 * | 6/2006 | Cook et al. ............... 323/207 |
| 2003/0067278 A1 | 4/2003 | Nakamura et al. |
| 2005/0162023 A1 | 7/2005 | Habu |
| 2007/0274109 A1 * | 11/2007 | Oyobe et al. ............... 363/37 |
| 2008/0031019 A1 * | 2/2008 | Alexander ............... 363/37 |
| 2009/0206781 A1 * | 8/2009 | Itoh et al. ............... 318/400.3 |
| 2009/0284200 A1 * | 11/2009 | Iwahori et al. ............ 318/400.27 |

FOREIGN PATENT DOCUMENTS

| | | |
|---|---|---|
| JP | 2004-112883 A | 4/2004 |
| JP | 2006-158040 A | 6/2006 |
| JP | 2009-201200 A | 9/2009 |

* cited by examiner

POWER CONVERTER

TECHNICAL FIELD

The present invention relates to a power converter applicable to, for example, an electric motor drive system, a hybrid electric vehicle and the like and having a load driving circuit for driving an AC load, which is capable of being supplied with power from both a DC power source circuit and a voltage source rectifier converting AC power into DC power.

BACKGROUND ART

As this type of power converter, there has conventionally been proposed, for example, an electrical load device that has a DC chopper for converting a first DC voltage output from a DC power source into a second DC voltage of a voltage level different from that of the first DC voltage, and first and second electrical loads driven by the second DC voltage (see Patent Literature 1, for example).

As shown in FIG. 23, a specific configuration of this electrical load device has an AC motor M1 that drives drive wheels, and an alternator M2 that is driven by an engine and generates AC power. The AC motor M1 is driven by a voltage source inverter IV1. The AC power generated by the alternator M2 is converted into DC power by a voltage source rectifier IV2. A positive bus L1 and negative bus L2 that connect the voltage source inverter IV1 and the voltage source rectifier IV2 to each other are connected by a smoothing capacitor C. The smoothing capacitor C connecting the positive bus L1 and the negative bus L2 to each other is connected to a DC chopper CV. This DC chopper CV boosts the voltage of DC power of a DC power source B, supplies the resultant DC power between the positive bus L1 and the negative bus L2, and lowers the voltage of DC power input from the voltage source inverter IV1 and the voltage source rectifier IV2 to charge the DC power source B.

Then, the voltage source inverter IV1, the voltage source rectifier IV2, and the DC chopper CV are controlled to be driven by a controller CD.

Patent Literature 1: Japanese Patent Application Publication No. 2004-112883

In the conventional example shown in FIG. 23, however, when the alternator M2 functions as a generator, the AC power generated by this alternator M2 drives the AC motor M1. However, in the system in which the alternator M2 is driven by the engine, the AC motor M1 tends to be driven using only the DC power source as much as possible for the purpose of energy conservation or $CO_2$ reduction.

For instance, in a hybrid vehicle using both an engine and an electric drive system, a battery or a large-volume capacitor is used as a DC power source. The battery or the capacitor with increased volume can be charged from a distribution system as well, so that the hybrid vehicle can travel approximately several tens of kilometers without operating the engine (electric vehicle (EV) traveling mode, including a regenerative braking mode). Such a plug-in hybrid vehicle is ready to be put into practical use.

During a period in which the hybrid vehicle travels in the electric vehicle (EV) traveling mode, output power of the alternator M2 functioning as an alternator is 0, and, therefore, the voltage source rectifier IV2 connected to the alternator M2 normally remains stopped. While the voltage source rectifier IV2 remains stopped, power is not supplied therefrom. Therefore, in order to obtain, from the AC motor M1, a motor torque that is equivalent to a torque obtained when the engine is operated, the power needs to be supplied from the DC power source B through the DC chopper CV. In this case, unfortunately, the problem is that it is inevitable to increase the conduction current of the DC chopper CV, increasing the size of the DC chopper CV.

DISCLOSURE OF THE INVENTION

The present invention was contrived in view of the problems of the prior art described above, and an object thereof is to provide a power converter that is capable of ensuring a necessary conduction current without increasing the size of a DC power circuit such as a DC chopper.

In order to accomplish the object described above, a power converter according to an embodiment of the present invention has: a voltage source rectifier converting AC power obtained from an AC power source into DC power; a DC power source; a DC voltage conversion circuit converting a DC voltage obtained from the DC power source into a different DC voltage; and a load driving circuit converting at least either the DC power output of the voltage source rectifier or the DC power output of the DC voltage conversion circuit into AC power to drive an AC load, wherein the DC power source is connected to the DC voltage conversion circuit to convert a voltage of the DC power source and supply the resultant voltage to the load driving circuit, and wherein the DC power source is connected to the voltage source rectifier via a DC power supply circuit and inductance elements, and the voltage source rectifier is controlled as a DC chopper, to convert the voltage of the DC power source and supply the resultant voltage to the load driving circuit.

In the power converter according to another embodiment of the present invention, the AC power source is configured by an alternator, and the inductance elements are each configured by a winding wire of the alternator.

In the power converter according to yet another embodiment of the present invention, the DC power supply circuit has a configuration in which the DC power source and a neutral point of the winding wire of the alternator are connected by a switch circuit.

In the power converter according to yet another embodiment of the present invention, the switch circuit is controlled to be turned on when the alternator is in a stopped state thereof and the voltage source rectifier is controlled as the DC chopper.

In the power converter according to yet another embodiment of the present invention, the DC power supply circuit has an auxiliary inductance element inserted thereto in series with the switch circuit.

In the power converter according to yet another embodiment of the present invention, the DC power supply circuit has a second DC power source that is different from the DC power source and is connected in series with the switch circuit.

In the power converter according to yet another embodiment of the present invention, a second switch circuit is provided to connect each of phases of AC input parts of the voltage source rectifier to the AC power source, one end of the DC power supply circuit is connected between the second switch circuit and each of the phases of the AC input parts of the voltage source rectifier, and the other end of the DC power supply circuit is connected to the DC power source by the inductance elements.

In the power converter according to yet another embodiment of the present invention, the DC power supply circuit has a third switch circuit that is connected to each of the phases of the AC input parts of the voltage source rectifier and connected in series with the inductance elements.

In the power converter according to yet another embodiment of the present invention, the second switch circuit is turned off to disconnect the voltage source rectifier from the AC power source, the third switch circuit is turned on to connect the DC power source between the second switch circuit and each of the phases of the AC input parts of the voltage source rectifier by each inductance element, and the voltage source rectifier is controlled as the DC chopper to convert the voltage of the DC power source and supply the resultant voltage to the load driving circuit.

In the power converter according to yet another embodiment of the present invention, the inductance elements are connected mutually in series with the third switch circuit.

In the power converter according to yet another embodiment of the present invention, the inductance elements are connected individually in series with the third switch circuit.

In the power converter according to yet another embodiment of the present invention, the DC power supply circuit has a second DC power source that is different from the DC power source and is connected in series with the third switch circuit.

In the power converter according to yet another embodiment of the present invention, a second switch circuit is provided to connect each of phases of AC input parts of the voltage source rectifier to the AC power source, and the DC power supply circuit is connected between each of the phases of the AC input parts of the voltage source rectifier and a serial connection point between switching elements configuring the DC voltage conversion circuit.

In the power converter according to yet another embodiment of the present invention, the DC power supply circuit has a configuration in which each of the phases of the AC input parts of the voltage source rectifier is connected to the serial connection point between the switching elements configuring the DC voltage conversion circuit, by a fourth switch circuit.

In the power converter according to yet another embodiment of the present invention, the load is an AC motor, and the load drive device is a voltage source inverter.

The present invention can achieve the effect of supplying a current, which is required by a load, from the DC power source, by using the voltage source rectifier as a DC chopper when the alternator is stopped, the voltage source rectifier being used for converting AC power generated by the alternator into DC power, even when the AC power cannot be obtained. The present invention can further achieve the effect of reducing the capacity of the DC chopper when this single DC chopper is enough to cover the current required by the load.

BEST MODE FOR CARRYING OUT THE INVENTION

Embodiments of the present invention are described hereinafter with reference to the drawings.

Figure 1:
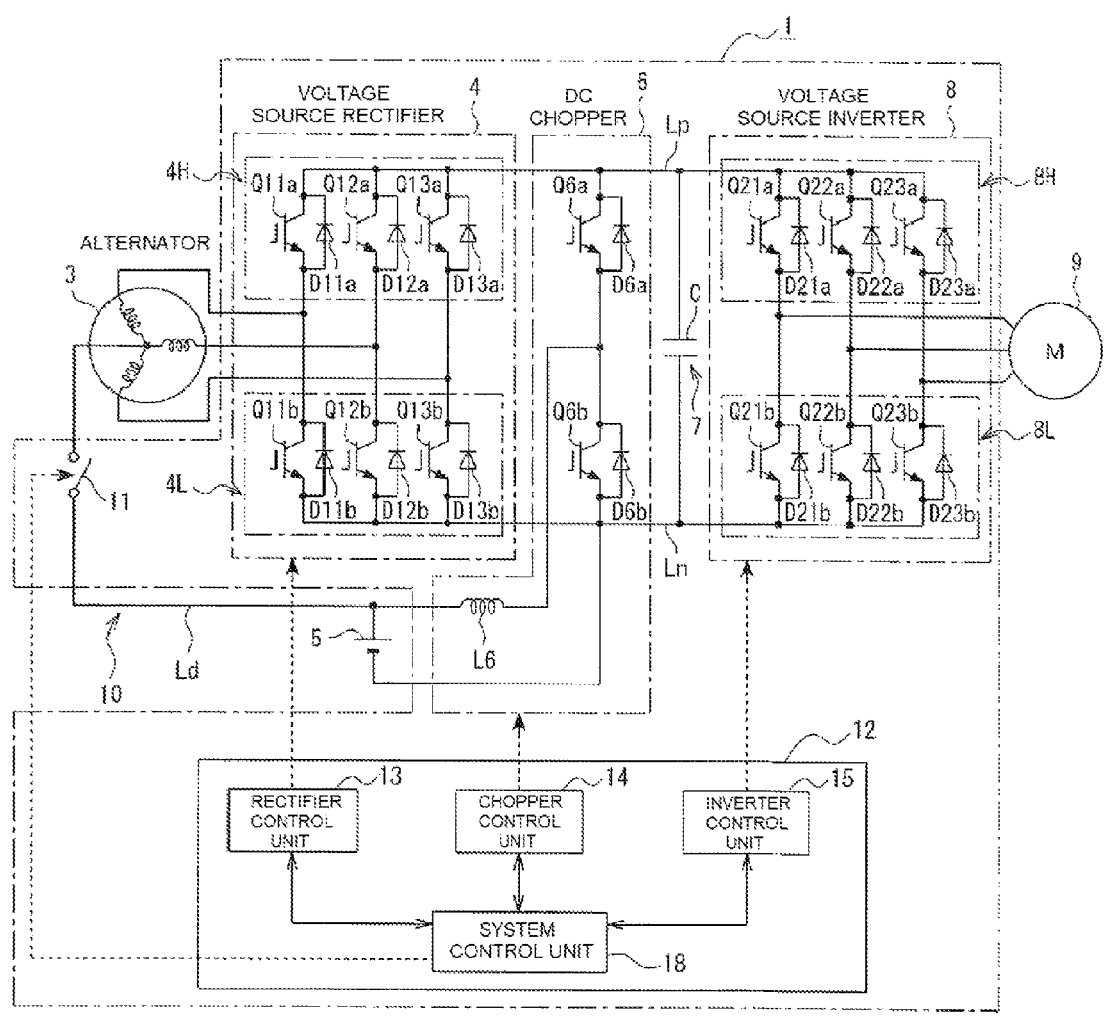
FIG. 1 is a circuit diagram of a power converter according to a first embodiment of the present invention.

FIG. 1 is a block diagram showing a power converter according to a first embodiment of the present invention, wherein reference numeral 1 represents the power converter applicable to a hybrid electric vehicle and the like. This power converter 1 has a voltage source rectifier 4, a DC chopper 6 functioning as a DC voltage conversion circuit, and a voltage source inverter 8 functioning as a load driving circuit. The voltage source rectifier 4 converts three-phase AC power that is output from an alternator 3 into DC power, the alternator 3 functioning as an AC power source to which is transmitted rotative power from an output shaft of an internal combustion engine or other type of engine.

The voltage source rectifier 4 has an upper arm part 4H and a lower arm part 4L connected to each other between a positive electrode line Lp and a negative electrode line Ln.

The upper arm part 4H has three switching elements $Q11a$ to $Q13a$, each of which is configured by, for example, an insulated gate bipolar transistor (IGBT), and diodes $D11a$ to $D13a$ that are connected to the switching elements $Q11a$ to $Q13a$ respectively in inverse parallel.

Collector of the switching elements $Q11a$ to $Q13a$ are connected to the positive electrode line Lp, and emitters of the same are connected to the lower arm part 4L.

The lower arm part 4L, too, has three switching elements $Q11b$ to $Q13b$, each of which is configured by, for example, an insulated gate bipolar transistor (IGBT), and diodes $D11b$ to $D13b$ that are connected to the switching elements $Q11b$ to $Q13b$ respectively in inverse parallel.

Collectors of the switching elements Q11b to Q13b are connected to the emitters of the switching elements Q11a to Q13a of the upper arm part 4H respectively, and emitters of the same are connected to the negative electrode line Ln.

AC power of the alternator 3 is supplied to an AC power input point, which is a connection point between each of the switching elements Q11a to Q13a of the upper arm part 4H and each of the switching elements Q11b to Q13b of the lower arm part 4L.

The power converter 1 also has a battery 5 functioning as a DC power source configured by a certain required number of battery units. DC power of the battery 5 is subjected to DC-DC conversion by the DC chopper 6 and then supplied to the positive electrode line Lp and the negative electrode line Ln. Here, the battery 5 is configured by, for example, connecting a certain required number of (e.g., several tens of) battery units of several volts in series, to output battery voltage Vb of several hundreds of volts.

This DC chopper 6 has a pair of switching elements Q6a and Q6b of, for example, insulated gate bipolar transistors (IGBT), which are connected in series between the positive electrode line Lp and the negative electrode line Ln, and diodes D6a and D6b that are connected to the pair of switching elements Q6a and Q6b respectively in inverse parallel. Furthermore, in the DC chopper 6, the negative electrode line Ln is connected to the negative-electrode side of the battery 5, and a reactor L6 is connected in series with the positive-electrode side of the battery 5. A section of the reactor L6 on the other side of the battery 5 is connected to a connection point between an emitter of the switching element Q6a and a collector of the switching element Q6b.

Moreover, between the positive electrode line Lp and the negative electrode line Ln, the power converter 1 further has a DC unit 7 with a smoothing capacitor C, which is connected in parallel with the switching elements Q6a and Q6b of the DC chopper 6.

The power converter 1 also has, between the positive electrode line Lp and the negative electrode line Ln, a voltage source inverter 8 connected in parallel with the smoothing capacitor C and functioning as a load drive device.

The voltage source inverter 8 has an upper arm part 8H and a lower arm part 8L that are connected in series between the positive electrode line Lp and the negative electrode line Ln.

The upper arm part 8H has three switching elements Q21a to Q23a, each of which is configured by, for example, an insulated gate bipolar transistor (IGBT), and diodes D21a to D23a that are connected to the switching elements Q21a to Q23a respectively in inverse parallel.

Collectors of the switching elements Q21a to Q23a are connected to the positive electrode line Lp, and emitters of the same are connected to the lower arm part 8L.

The lower arm part 8L, too, has three switching elements Q21b to Q23b, each of which is configured by, for example, an insulated gate bipolar transistor (IGBT), and diodes D21b to D23b that are connected to the switching element Q21b to Q23b respectively in inverse parallel.

Collectors of the switching elements Q21b to Q23b are connected to the emitters of the switching elements Q21a to Q23a of the upper arm part 8H respectively, and emitters of the same are connected to the negative electrode line Ln.

An AC motor 9 functioning as an AC load is connected to an AC power output point, which is a connection point between each of the switching elements Q21a to Q23a of the upper arm part 8H and each of the switching elements Q21b to Q23b of the lower arm part 8L.

The power converter 1 further has a DC power supply path 10 that connects each of the AC input points of the voltage source rectifier 4 and a connection point between the battery 5 and the reactor L6. The DC power supply path 10 has a DC power supply line Ld that has its one end connected to a neutral point of the alternator 3 and the other end to the connection point between the battery 5 and the reactor L6. A switch circuit 11 is inserted into the DC power supply line Ld.

The voltage source rectifier 4, DC chopper 6, voltage source inverter 8, and switch circuit 11 are controlled to be driven by a controller 12.

The controller 12 has a rectifier control unit 13 controlling to drive the voltage source rectifier 4, a chopper control unit 14 controlling to drive the DC chopper 6, an inverter control unit 15 controlling to drive the voltage source inverter 8, and a system control unit 18 that is in charge of the operations of the entire power converter 1, i.e., the linkage among the rectifier control unit 13, chopper control unit 14, and inverter control unit 15.

The rectifier control unit 13 functions to drive-control the voltage source rectifier 4 as a rectifier and also functions as a chopper control circuit to operate the voltage source rectifier 4 as a DC chopper.

Figure 2:
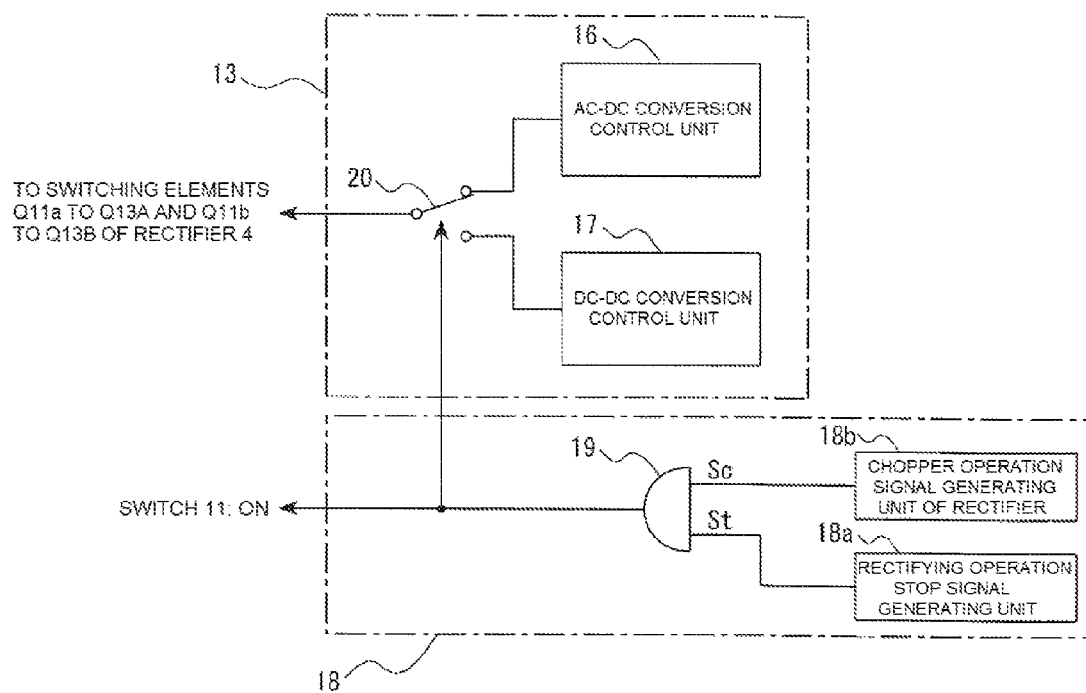
FIG. 2 is a block diagram showing a specific configuration of a rectifier control unit of a controller.

As shown in FIG. 2, the rectifier control unit 13 has an AC-DC conversion control unit 16 that rectifies and converts three-phase AC power into DC power, the three-phase AC power being input from the alternator 3 when the alternator 3 generates power, and a DC-DC conversion control unit 17 that operates the voltage source rectifier 4 as a DC chopper.

The AC-DC conversion control unit 16 forms a gate drive signal for controlling the gates of the switching elements Q11a to Q13a and Q11b to Q13b of the voltage source rectifier 4 in accordance with the phase of the AC power output from the alternator 3 to cause the voltage source rectifier 4 to perform a rectifying operation, while the alternator 3 is in a generating state in which the alternator 3 is driven to rotate by the internal combustion engine or other type of engine.

When boosting the battery voltage Vb of the battery 5 and supplying the boosted battery voltage to the DC unit 7 as with the chopper control unit 14 described hereinafter, the DC-DC conversion control unit 17 forms a gate drive signal for turning off the switching elements Q11a to Q13a of the upper arm part 4H and a gate drive signal for simultaneously turning on/off the switching elements Q11b to Q13b of the lower arm part 4L, to cause the voltage source rectifier 4 to perform a step-up chopper operation. In addition, when lowering the voltage of the DC power of the DC unit 7 to charge the battery 5, the DC-DC conversion control unit 17 forms a gate drive signal for turning off the switching elements Q11b to Q13b of the lower arm part 4L and a gate signal for simultaneously turning on/off the switching elements Q11b to Q13b of the upper arm part 4H, to cause the voltage source rectifier 4 to perform a step-down chopper operation.

When turning on/off the switching elements to cause the voltage source rectifier 4 to perform the step-up or step-down chopper operation, the DC-DC conversion control unit 17 may perform pulse width modulation (PWM) control for turning on/off the switching elements at a predetermined duty ratio. Alternatively, the DC-DC conversion control unit 17 may detect an output voltage of a DC chopper circuit, compare the detected output voltage with a voltage reference value, and turn on/off the switching elements based on the result of the comparison. The same is true in each of the following embodiments; thus, a variety of control methods are applicable as a DC chopper control method.

The system control unit 18 has at least a rectifying operation stop signal generating unit 18a that generates a rectifying operation stop signal St, a chopper operation signal generating unit 18b that generates a chopper operation signal Sc, and an AND circuit 19 into which the rectifying operation stop signal St and the chopper operation signal Sc are input.

The rectifying operation stop signal St is for stopping the alternator 3 to stop the rectifying operation performed by the voltage source rectifier 4 when a logical value thereof is "1." The chopper operation signal Sc is for causing the voltage source rectifier 4 to perform a chopper operation when a logical value thereof is "1."

An output of the AND circuit 19 is supplied directly to the switch circuit 11 to open/close the switch circuit 11, and is supplied, as a selection signal, to a selecting switch 20 that selects either an output of the AC-DC conversion control unit 16 or an output of the DC-DC conversion control unit 17.

The switch circuit 11 is opened when the output of the AND circuit 19 is at a low level, that is, when the logical value is "0," and closed when the output of the AND circuit 19 is at a high level, that is, when the logical value is "1." The selecting switch 20 selects the output of the AC-DC conversion control unit 16 when the output of the AND circuit 19 is at a low level, that is, when the logical value is "0," and selects the output of the DC-DC conversion control unit 17 when the output of the AND circuit 19 is at a high level, that is, when the logical value is "1." Then, the output selected by the selecting switch 20 is supplied to the gate of each of the switching elements Q11a to Q13a and Q11b to Q13b of the voltage source rectifier 4.

As in the case where the voltage source rectifier 4 is caused to perform the chopper operation, the chopper control unit 14 forms a gate drive signal for turning off the switching element Q6a and a gate drive signal for turning on/off the switching element Q6b, when the step-up chopper operation is performed. The chopper control unit also forms a gate drive signal for turning off the switching element Q6b and a gate signal for turning on/off the switching element Q6a, when the step-down chopper operation is performed where the voltage of the DC power of the DC unit 7 is lowered to charge the battery 5.

In an operating state in which the AC motor 9 is operated as an electric motor, the inverter control unit 15 forms a DC-AC conversion gate drive signal for turning on/off the switching elements Q21a to Q23a configuring the upper arm part 8H of the voltage source inverter 8 and the switching elements Q21b to Q23b configuring the lower arm part 8L, in response to a necessary motor torque. In a regenerative braking state of the AC motor 9, the inverter control unit 15 forms an AC-DC conversion gate drive signal for operating the voltage source inverter 8 as a rectifier, and supplies the AC-DC conversion gate drive signal to the gate of each of the switching elements Q21a to Q23a and Q21b to Q23b.

Next, operations according to the first embodiment are described.

In a state in which the alternator 3 is driven to rotate by the internal combustion engine or other type of engine, the logical value of the rectifying operation stop signal St of the system control unit 18 is "0," and the logical value of the output of the AND circuit 19 is "0." Therefore, the selecting switch 20 selects the output of the AC-DC conversion control unit 16, and the gate drive signal formed by the AC-DC conversion control unit 16 is output to each of the switching elements Q11a to Q13a and Q11b to Q13b of the voltage source rectifier 4. Furthermore, the switch circuit 11 is turned off.

As a result, the voltage source rectifier 4 performs the rectifying operation and converts the AC power output from the alternator 3 into DC power. This DC power is smoothed by the smoothing capacitor C and then supplied to the voltage source inverter 8.

In the voltage source inverter 8, the inverter control unit 15 of the controller 12 forms a gate drive signal for obtaining motor voltage/motor current corresponding to the necessary motor torque, and the three-phase AC power output from each AC output point is output to the AC motor 9. As a result, the AC motor 9 is driven to rotate, whereby the drive wheels coupled to the AC motor 9 via a power transmission mechanism are driven, allowing the vehicle to travel.

When the alternator 3 is stopped to change its rotary drive state to the regenerative braking state in which a brake is applied to the AC motor 9, regenerative power of the AC motor 9 is input to the voltage source inverter 8. In this regenerative braking state, the inverter control unit 15 controls the voltage source inverter 8 to perform the rectifying operation as with the voltage source rectifier 4, and converts the regenerative power to the DC power. This DC power is smoothed by the smoothing capacitor C and supplied to the DC chopper 6 and the voltage source rectifier 4.

At this moment, the gate signal for turning the switching element Q6b off and the gate signal for turning the switching element Q6a on/off are output from the chopper control unit 14. The DC chopper 6 is subjected to step-down chopper control, whereby the battery 5 is charged. At the same time, in the system control unit 18, the logical value of the rectifying operation stop signal St is "1," and the alternator 3 is stopped.

When reducing the load of the DC chopper 6, the logical value of the chopper operation signal Sc for causing the voltage source rectifier 4 to perform the chopper operation is set at "1." As a result, the logical value of the output of the AND circuit 19 becomes "1." Therefore, the switch circuit 11 is turned on, and the selecting switch 20 selects the DC-DC conversion control unit 17.

The DC-DC conversion control unit 17 outputs the gate signal for turning off the switching elements Q11b to Q13b of the lower arm part 4L of the voltage source rectifier 4, and further outputs the gate signal for simultaneously turning on/off the switching elements Q11a to Q13a of the upper arm part 4H, to cause the voltage source rectifier 4 to function as a step-down chopper having a winding wire of the alternator 3 as an inductance element. Therefore, the battery 5 can be charged not only through the DC chopper 6 but also through the voltage source rectifier 4, the winding wire of the alternator 3, and the switch circuit 11. Here, the voltage source rectifier 4 can be subjected to the step-down chopper control by the DC-DC conversion control unit 17, independently of the chopper control unit 14.

In order to drive to rotate the AC motor 9 in the stopped state of the alternator 3 in which rotary drive force of the internal combustion engine or other type of engine is not transmitted to the alternator 3, drive control for a so-called electric vehicle (EV) is performed where the AC motor 9 is driven to rotate using only the power of the battery 5. In this case, the DC chopper 6 is subjected to step-up chopper control by the chopper control unit 14. When reducing the load of the DC chopper 6 in such a case, the voltage source rectifier 4 is subjected to the step-up chopper control by the rectifier control unit 13.

In this state of step-up chopper control, as with a normal hybrid vehicle, DC power obtained by boosting the battery voltage Vb of the battery 5 can be supplied from the DC chopper 6 to the smoothing capacitor C, smoothed by the smoothing capacitor C, and supplied to the voltage source inverter 8.

In so doing, the system control unit 18 sets both the logical value of the rectifying operation stop signal St and the logical value of the chopper operation signal Sc supplied from the chopper operation signal generating unit 18b at "1." As a result, the logical value of the output of the AND circuit 19 becomes "1" and supplied directly to the switch circuit 11, turning the switch circuit 11 on. Consequently, the DC power of the battery 5 is supplied to the AC input points of the voltage source rectifier 4 via the switch circuit 11 and the winding wire of the alternator 3. Therefore, the inductance of the winding wire of the alternator 3 and the switching elements Q11$a$ to Q13$a$ of the upper arm part 4H of the voltage source rectifier 4 described hereinafter are turned off, and the switching elements Q11$b$ to Q13$b$ of the lower arm part 4L are simultaneously turned on/off, thereby configuring a step-up chopper circuit.

Furthermore, since the output of the AND circuit 19 is supplied to the selecting switch 20, the output of the DC-DC conversion control unit 17 is selected by the selecting switch 20. The gate drive signal formed by the DC-DC conversion control unit 17 is supplied to the gate of each of the switching elements Q11$a$ to Q13$a$ of the upper arm part 4H of the voltage source rectifier 4 and to the gate of each of the switching elements Q11$b$ to Q13$b$ of the lower arm part 4L of the same.

Consequently, the step-up chopper control is performed in which the switching elements Q11$a$ to Q13$a$ configuring the upper arm part 4H of the voltage source rectifier 4 are turned off and the switching elements Q11$b$ to Q13$b$ configuring the lower arm part 4L are simultaneously turned on/off. As a result of this step-up chopper control, the battery voltage Vb of the battery 5 is boosted and supplied, as DC power, to the voltage source inverter 8 via the smoothing capacitor C.

Therefore, the DC power that is obtained by boosting the battery voltage Vb of the battery 5 by means of both the DC chopper 6 and the voltage source rectifier 4 is supplied to the voltage source inverter 8. Thus, compared to when supplying DC power to the voltage source inverter 8 only through the DC chopper 6, more current can be supplied to the voltage source inverter 8, When performing DC chopper control using the switching elements Q11$a$ to Q13$a$ and Q11$b$ to Q13$b$ configuring the voltage source rectifier 4, the DC chopper having three elements of the same volume is connected in parallel with the DC chopper 6, so that more current can be supplied to the voltage source inverter 8, compared to when supplying the DC power to the voltage source inverter 8 by using only the DC chopper 6. Moreover, the degree of freedom in selecting a current capacity of the DC chopper 6 can be increased.

As a result, a drive current for driving the AC motor 9 using the voltage source inverter 8 can be increased more than in the prior art. In addition, when the power converter 1 is applied to a hybrid electric vehicle and a large motor torque is required in order to start or suddenly accelerate the vehicle in the EV traveling mode, drive force can reliably be ensured without causing power shortages.

Moreover, because the voltage source rectifier 4 is used as a chopper in order to ensure a large drive current for driving the AC motor 9, the entire configuration can be simplified without providing a new DC chopper circuit or increasing the size of the DC chopper 6.

A driving circuit for a hybrid electric vehicle and the like needs to be mounted in a limited space. However, when the circuit configuration according to the first embodiment described above is employed, a conduction current of the DC chopper 6 can be inhibited by keeping the necessary current of the voltage source inverter 8 unchanged, reducing the size of the DC chopper 6. On the other hand, when the conduction current of the DC chopper 6 is not inhibited, a circuit capable of producing a larger output by using the voltage source rectifier 4 can be mounted, significantly improving the acceleration/deceleration performance of the electric vehicle.

Additionally, in the first embodiment described above, the DC chopper circuit configured by the winding wire of the alternator 3 and the voltage source rectifier 4 is formed in parallel with the DC chopper 6. Thus, in case of a problem in the DC chopper 6, the chopper control unit 14 is caused to stop driving the DC chopper 6 so that the DC power boosted by the DC chopper circuit configured by the winding wire of the alternator 3 and the voltage source rectifier 4 can be supplied to the voltage source inverter 8, and the AC motor 9 can be driven continuously by the battery 5, even with the presence of the problem in the DC chopper 6.

Furthermore, the first embodiment described above has the two DC chopper circuits: the DC chopper 6 and the DC chopper circuit configured by the winding wire of the alternator 3 and the upper and lower arm parts 4H, 4L of the voltage source rectifier 4. Because both of the DC chopper circuits are controlled by two different control units, i.e., the chopper control unit 14 and the DC-DC conversion control unit 17 of the rectifier control unit 13, the timings for switching the switching elements of both of the chopper circuits can be shifted. Shifting the switching timings of the chopper circuits can reduce a voltage ripple of the smoothing capacitor C. However, when voltage ripples of the same width are permitted, the switching frequency in the chopper operations of the DC chopper 6 and the voltage source rectifier 4 can be reduced, and the switching loss of the DC chopper 6 and the voltage source rectifier 4 can be reduced, reducing the size of each DC chopper and increasing the efficiency thereof.

Figure 3:
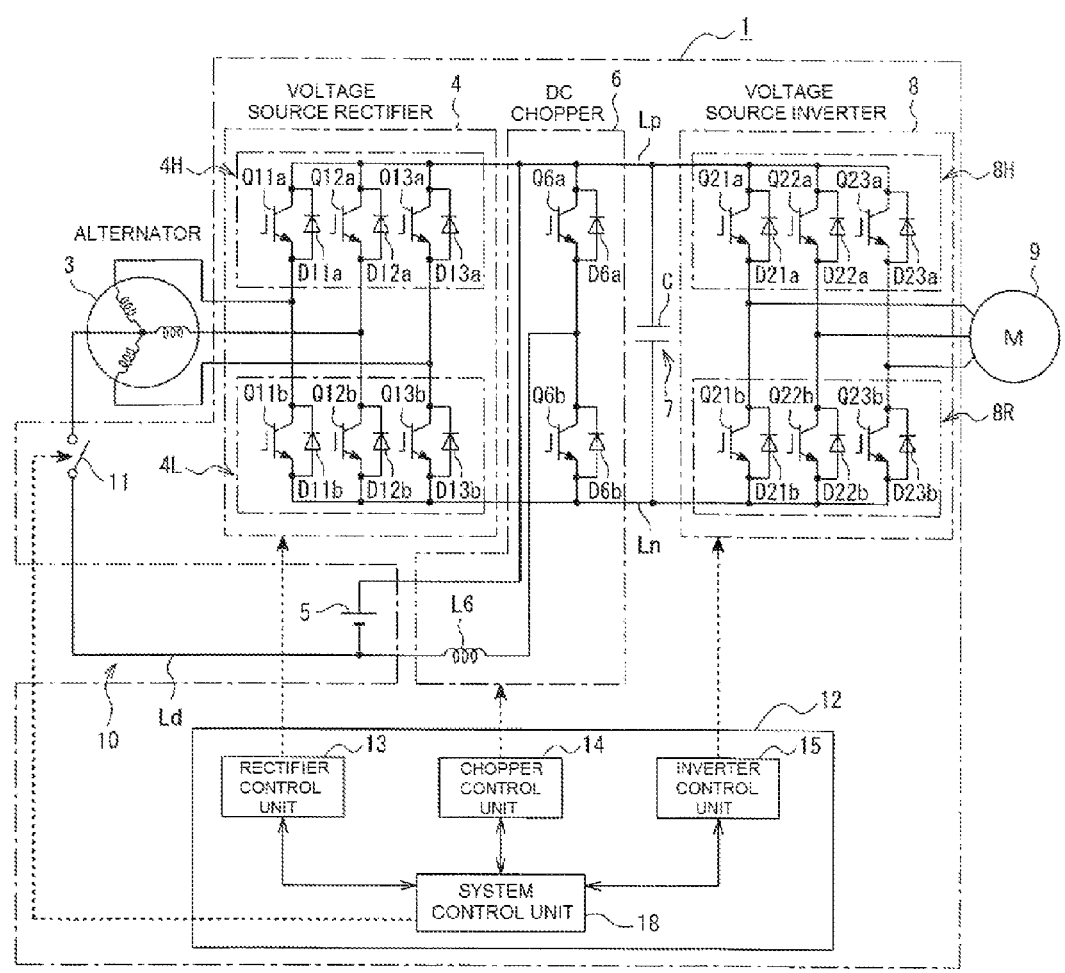
FIG. 3 is a circuit diagram showing a modification of the first embodiment.

The first embodiment above has described a configuration of connecting the rector L6 to the positive-electrode side of the battery 5; however, not only this configuration but also the configuration shown in FIG. 3 is applicable as well. In other words, the reactor L6 can be inserted between the negative-electrode side of the battery 5 and the connection point between the switching elements Q6$a$ and Q6$b$ to configure a series circuit. Moreover, the same operational effects as those described in the first embodiment can be accomplished by connecting the positive-electrode side of the battery 5 to the positive electrode line Lp.

In this case, the connection point between the battery 5 and the reactor L6 is connected to the neutral point of the alternator 3 by the DC power supply line Ld. In so doing, a step-up operation is performed by the DC chopper 6 by keeping the switching element Q6$b$ off and turning the switching element Q6$a$ on/off, so that the DC power from the battery 5 can be supplied between the positive electrode line Lp and the negative electrode line Ln. As with this operation, the voltage source rectifier 4 can be used as a step-up chopper by keeping the switching elements Q11$b$ to Q13$b$ of the lower arm part 4L of the voltage source rectifier 4 off and simultaneously turning on/off the switching elements Q11$a$ to Q13$a$ configuring the upper arm part 4H, so that the DC power from the battery 5 can be supplied between the positive electrode line Lp and the negative electrode line Ln.

The first embodiment above has also described a configuration in which the inductance of the winding wire of the alternator 3 is used as a reactor. However, when the inductance of the winding wire of the alternator is not enough, not only the abovementioned configuration but also the configuration shown in FIG. 4 may be used in order to compensate for the lack of inductance by inserting a reactor L10 serving as an auxiliary inductance element between the switch circuit 11 and the battery 5.

Figure 4:
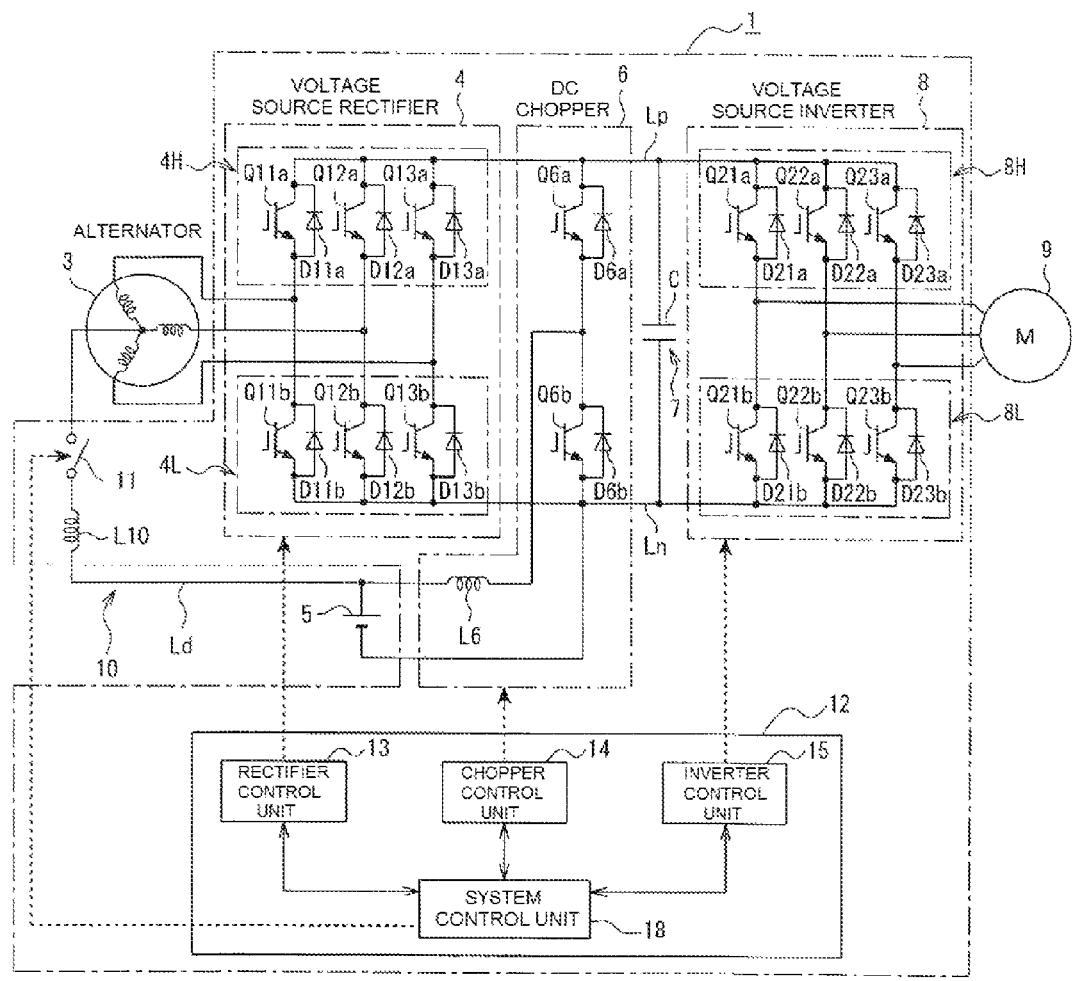
FIG. 4 is a circuit diagram showing another modification of the first embodiment.

It should be noted that the reactor L10 may be connected between the switch circuit 11 and the battery 5 as shown in FIG. 4, but may also be connected between the switch circuit 11 and the neutral point of the winding wire of the alternator 3.

Figure 5:
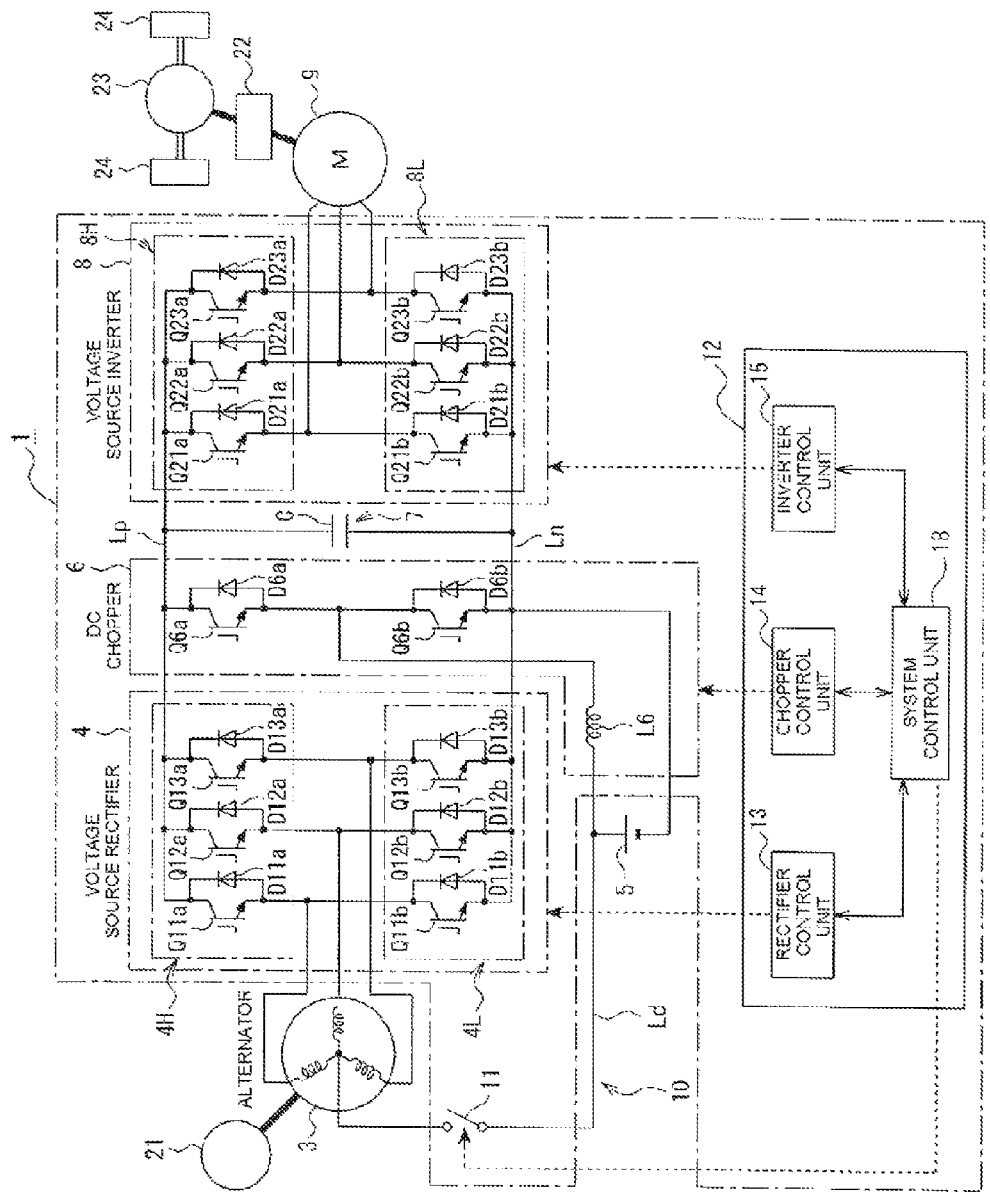
FIG. 5 is a circuit diagram showing yet another modification of the first embodiment.

When configuring a hybrid electric vehicle using the configuration described in the first embodiment, as shown in FIG. 5, while the alternator 3 is coupled to an internal combustion engine 21 or other type of engine to transmit rotary drive force of the internal combustion engine 21 to the alternator 3, an output shaft of the AC motor 9 may be coupled to a differential gear 23 by a deceleration mechanism 22 according to need, and right and left drive wheels 24 may be coupled to the differential gear 23. In this case, the internal combustion engine 21 and the AC motor 9 may be coupled directly to each other. Or, the internal combustion engine 21 and the AC motor 9 may be connected in parallel with a power split mechanism configured by, for example, a planetary gear train, and then the alternator 3 may be coupled to the power split mechanism.

A second embodiment of the present invention is described next with reference to FIG. 6.

In the second embodiment, a dedicated DC power source is provided as the DC power source of the DC chopper configured by the winding wire of the alternator 3 and the voltage source rectifier 4.

Figure 6:
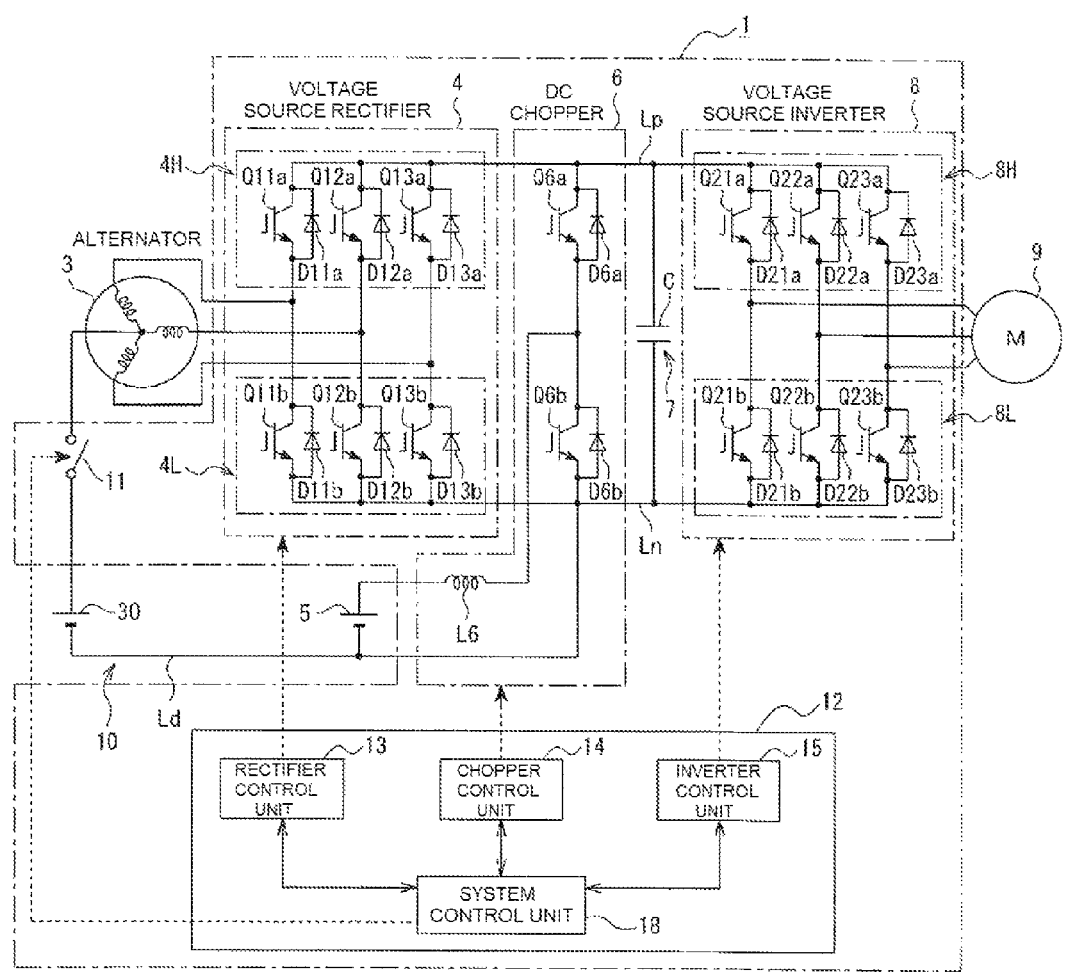
FIG. 6 is a circuit diagram showing a second embodiment of the present invention.

In the second embodiment shown in FIG. 6, the connection point of the series circuit configured by the battery 5 and the reactor L6 in the configuration of the first embodiment shown in FIG. 1 is removed from the connection point between the battery 5 and the reactor L6 and connected to the connection point between the negative-electrode side of the battery 5 and the negative electrode line Ln, the battery 5 serving as a first DC power source of the DC power supply line Ld. Furthermore, a second battery 30 serving as a dedicated second DC power source is inserted between the switch circuit 11 on the DC power supply line Ld and the negative-electrode side of the battery 5.

According to the second embodiment, when the alternator 3 is stopped, the DC chopper 6 performs the step-up chopper operation to boost the battery voltage Vb of the battery 5, and performs the step-up chopper operation to boost a battery voltage Vb2 of the dedicated second battery 30 in the DC chopper circuit configured by the winding wire of the alternator 3 and the voltage source rectifier 4. As a result, DC power can be supplied from both the battery 5 and the second battery 30.

In the first embodiment described above, the capacity of the battery 5 needs to be increased in order to allow the electric vehicle (EV) to travel farther. However, simply increasing the number of unit batteries configuring the battery 5 disturbs the balance in the charging conditions and deterioration conditions of the unit batteries due to the individual variability of the unit batteries, and this disturbance becomes severe and severe by the number of added unit batteries. For this reason, charge/discharge of the battery or the entire capacitor needs to be controlled according to the unit batteries that are in their poor charging and deterioration conditions, preventing the effective use of the accumulated energy of the good-conditioned battery or capacitor.

In the second embodiment, on the other hand, the capacity of the first battery 5 of the DC chopper 6 does not have to be increased. With the dedicated second battery 30 provided in the DC chopper circuit configured by the winding wire of the alternator 3 and the voltage source rectifier 4, the DC power can be supplied from both the first battery 5 and the second battery 30. DC power to be supplied to the voltage source inverter 8 can be increased without increasing the capacity of the first battery 5 or the conduction current of the DC chopper 6. Moreover, an output of the second battery 30 can be controlled independently of the output of the first battery 5 controlled by the DC chopper 6. The first and second DC power sources configured by the batteries can be subjected to charge/discharge control independently of each other. Therefore, disturbance in the balance of charging and deterioration conditions of the batteries can be minimized, compared to when simply increasing the capacity of the first DC power source. For this reason, the accumulated energies of the batteries can be used effectively.

The second embodiment has described a configuration in which the second battery 30 is applied; however, instead of using the second battery 30, a DC power source can be obtained by connecting a plurality of low-volume unit capacitors having charge/discharge characteristics in a series-parallel arrangement, or one or more large-volume charge/discharge capacitors may be used as a DC power source.

Figure 7:
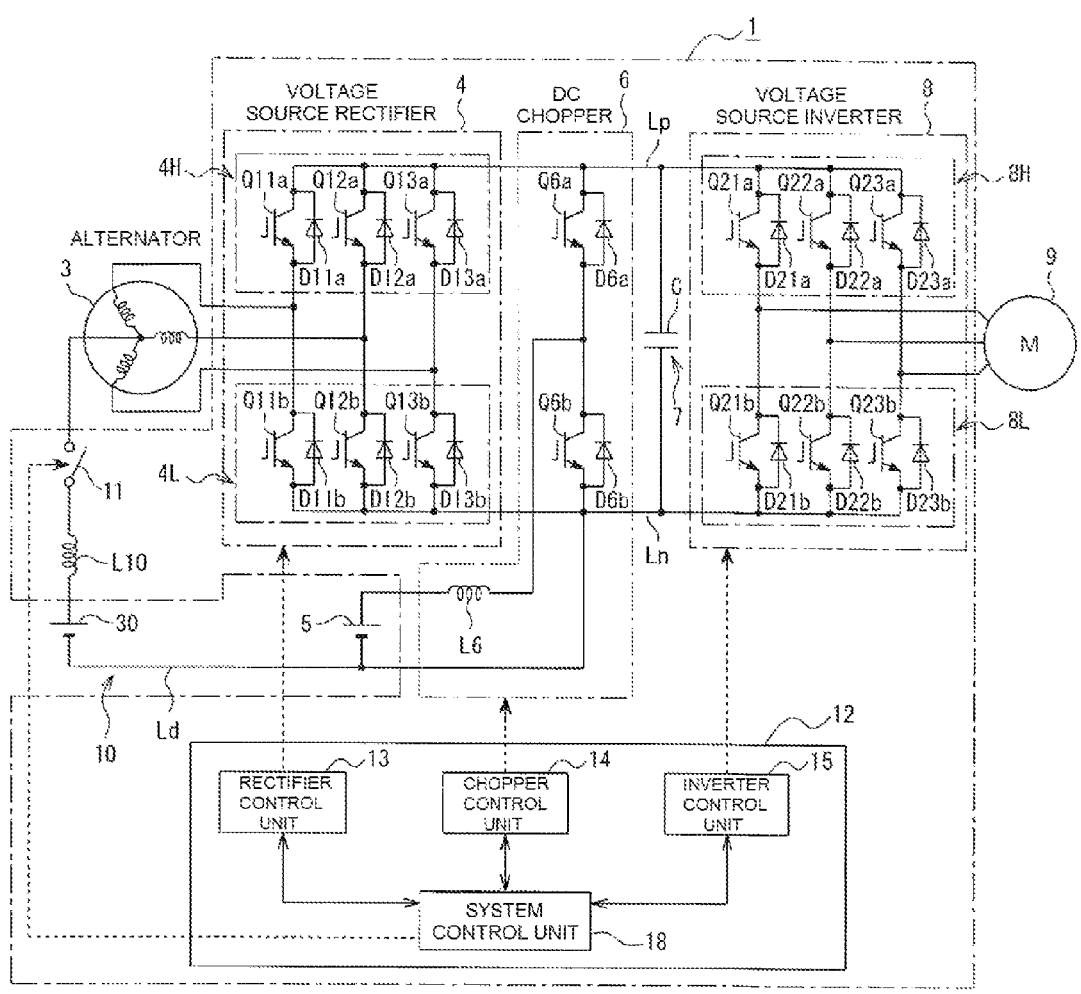
FIG. 7 is a circuit diagram showing a modification of the second embodiment.

In the second embodiment as well, when the inductance is not sufficiently obtained from the winding wire of the alternator 3 only, the switching frequency of the switching elements Q11a to Q13a and Q11b to Q13b of the voltage source rectifier 4 performing the chopper operation need to be increased. In this case, the reactor L10 functioning as an auxiliary inductance element may be inserted in series with the switch circuit 11, as shown in FIG. 7. Inserting the reactor L10 eliminates the need for switching the switching elements Q11a to Q13a and Q11b to Q13b of the voltage source rectifier 4 at an excessively high frequency. Therefore, the switching loss and the size of the voltage source rectifier 4 can be reduced.

As shown in FIG. 7, the reactor L10 may be connected between the switch circuit 11 and the second battery 30 or between the switch circuit 11 and the neutral point of the winding wire of the alternator 3.

Figure 8:
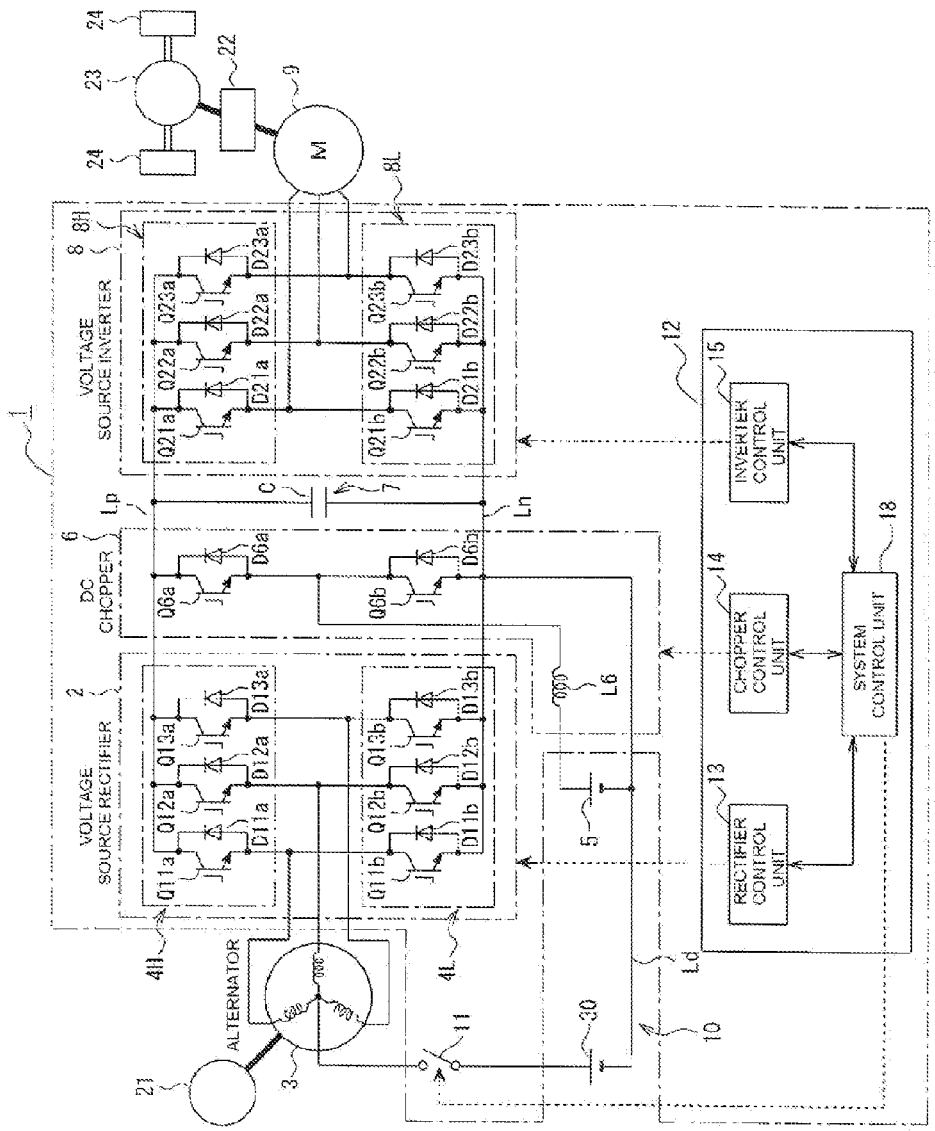
FIG. 8 is a circuit diagram showing another modification of the second embodiment.

In addition, when configuring a hybrid electric vehicle using the configuration described in the second embodiment, as shown in FIG. 8, while the alternator 3 is coupled to the internal combustion engine 21 or other type of engine to transmit the rotary drive force of the internal combustion engine 21 to the alternator 3, the output shaft of the AC motor 9 may be coupled to the differential gear 23 by the deceleration mechanism 22 according to need, and the right and left drive wheels 24 may be coupled to the differential gear 23.

A third embodiment of the present invention is described next with reference to FIG. 9.

In the third embodiment, a two-system DC chopper circuit is configured without using the inductance of the winding wire of the alternator 3.

Figure 9:
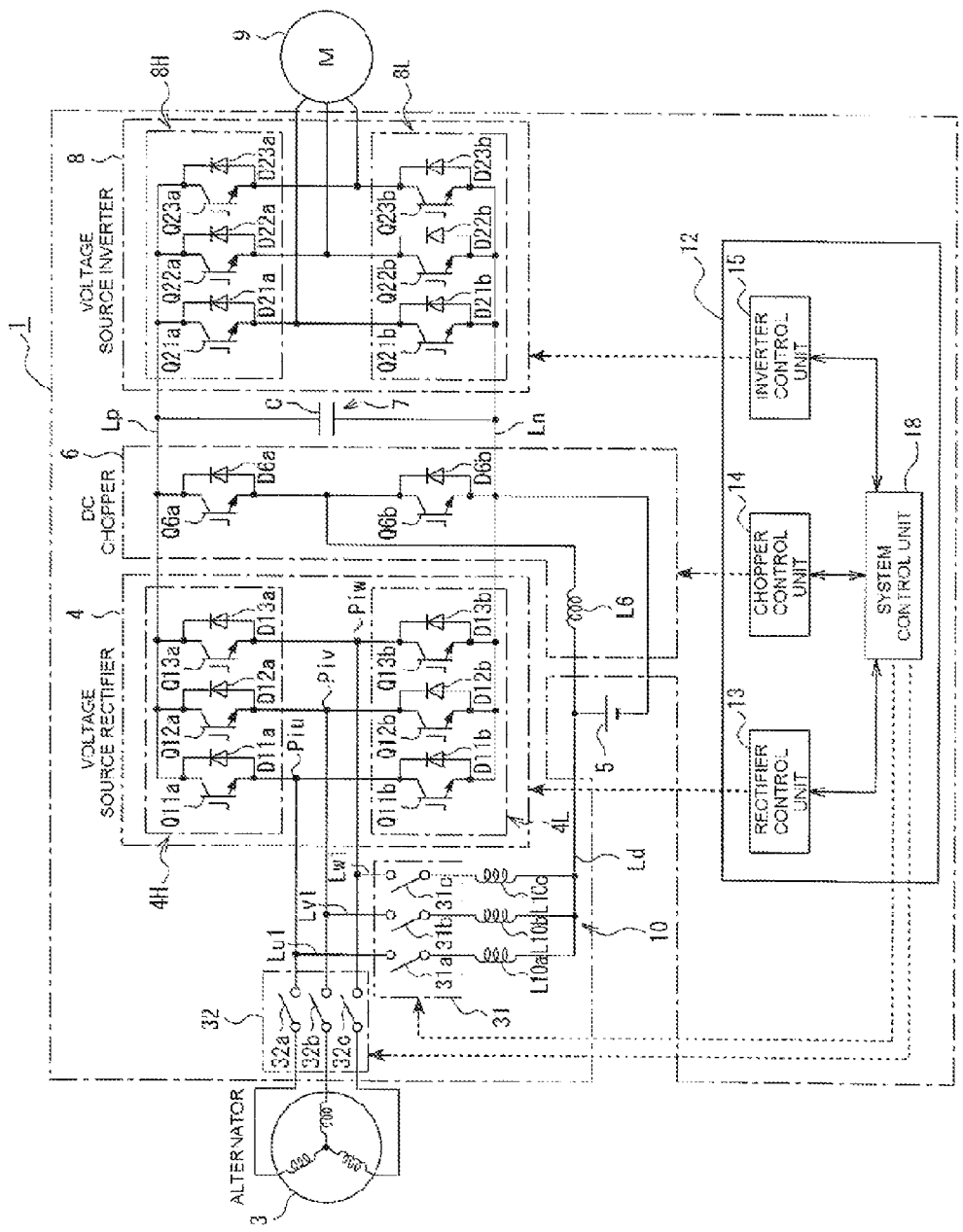
FIG. 9 is a circuit diagram showing a third embodiment of the present invention.

Specifically, in the third embodiment, the configuration of the first embodiment shown in FIG. 3 is provided with connection lines Lu1 to Lw1 that connect a DC power supply circuit 10 to the AC input points Piu to Piw of the voltage source rectifier 4 individually as shown in FIG. 9.

Serial connections between switches 31a to 31c configuring a first switch circuit 31 and reactors L10a to L10c are inserted in these connection lines Lu1 to Lw1. The number of switches 31a to 31c is equivalent to the number of phases of the alternator 3. Ends on one side of a series circuit formed by the switches 31a to 31c and the reactors L10a to L10c are connected to the AC input points Piu to Piw. The other ends of the series circuit are connected to each other and then connected to the connection point between the battery 5 and the reactor L6. The order of connecting these parts in the series circuit may be such that the reactors L10a to L10c are connected on the battery 5 side from the switches 31a to 31c or connected on the AC input points Piu to Piw side from the switches 31a to 31c.

Additionally, switches 32a to 32c configuring a second circuit 32 are inserted between the connection lines Lu1 to Lw1 on the output side of the alternator 3 and the AC input points Piu to Piw. The number of switches 32a to 32c is equivalent to the number of phases of the alternator 3.

When turning on each of the switches 31a to 31c of the first switch circuit 31, the system control unit 18 of the controller 12 turns off each of the switches 32a to 32c of the second switch circuit 32. When, on the other hand, turning off each of the switches 31a to 31c of the first switch circuit 31, the system control unit 18 turns on each of the switches 32a to 32c of the second switch circuit 32.

According to the third embodiment, while the alternator 3 is driven to rotate, each of the switches 31a to 31c of the first switch circuit 31 is turned off, whereas each of the switches 32a to 32c of the second switch circuit 32 is turned on. Therefore, the AC power generated by the alternator 3 is input to the AC input points Piu to Piw of the voltage source rectifier 4. As a result of controlling the switching elements Q11a to Q13a and Q11b to Q13b of the upper arm part 4H and the lower arm part 4L of the voltage source rectifier 4 by means of the gate drive signals formed by the AC-DC conversion control unit 16, the rectifying operation is carried out. The DC power that is output from the voltage source rectifier 4 is smoothed by the smoothing capacitor C and then supplied to the voltage source inverter 8. Consequently, the AC power that is output from the AC output points of the voltage source inverter 8 is supplied to the AC motor 9, whereby the AC motor 9 is driven to rotate.

When the AC motor 9 enters the regenerative braking state as a result of application of a brake to the AC motor 9, the AC power that is output from the AC motor 9 is converted into DC power by the voltage source inverter 8, and subjected to the step-up chopper control by the DC chopper 6. As a result, the battery 5 is charged. At this moment, the state of the alternator 3 changes from the rotary drive state to the stopped state.

In this case, when the voltage source rectifier 4 performs the chopper operation, each of the switches 31a to 31c of the first switch circuit 31 is turned on, and each of the switches 32a to 32c of the second switch circuit 32 is turned off. In this state, each of the switching elements Q11b to Q13b of the lower arm part 4L of the voltage source rectifier 4 is turned off, and each of the switching elements Q11a to Q13a of the upper arm part 4H is turned on/off, so that the step-down chopper control is performed to charge the battery 5 also on the voltage source rectifier 4 side.

Moreover, as with the case in the first embodiment, when the DC chopper 6 performs the step-up chopper operation in the stopped state of the alternator 3, the battery voltage Vb of the battery 5 can be boosted and then supplied to the smoothing capacitor C. When, at this moment, the voltage source rectifier 4 is caused to perform the chopper operation, each of the switches 31a to 31c of the first switch circuit 31 is turned on, and each of the switches 32a to 32c of the second switch circuit 32 is turned off, as with the case in the first embodiment.

In this state, each of the switching elements Q11a to Q13a of the upper arm part 4H of the voltage source rectifier 4 is turned off, and each of the switching elements Q11b to Q13b of the lower arm part 4L is turned on/off, so that the step-up chopper control is performed, and, accordingly, the battery voltage Vb of the battery 5 is boosted and supplied to the smoothing capacitor C.

Thus, the battery voltage Vb of the battery 5 is boosted by both the DC chopper 6 and the DC chopper circuit configured by the reactors L10a to L10c and the voltage source rectifier 4, and then supplied to the voltage source inverter 8.

Accordingly, the same operational effects as those described in the first embodiment can be accomplished.

In the configuration shown in FIG. 9, the current is not applied to the alternator 3 when using the voltage source rectifier 4 as a DC chopper, preventing the alternator from producing heat. Furthermore, because the step-up/down reactors L10a to L10c are provided with respect to the phases of the voltage source rectifier 4, the step-up chopper control can be performed independently, for each phase, by the reactors L10a to L10c and each of the switching elements Q11b to Q13b of the lower arm part 4L of the voltage source rectifier 4. In such a case, shifting the switching phases of the switching elements Q11b to Q13b can prevent the occurrence of a ripple in the DC output. One or more pairs can be selected from among a pair of switching elements Q11a and Q11b, a pair of switching elements Q12a and Q12b, and a pair of switching elements Q13a and Q13b in order to perform the step-up chopper operation, depending on the amount of current required.

Similarly, the step-down chopper control can be performed independently, for each phase, by the reactors L10a to L10c and each of the switching elements Q11a to Q13a of the upper arm part 4H of the voltage source rectifier 4.

Figure 10:
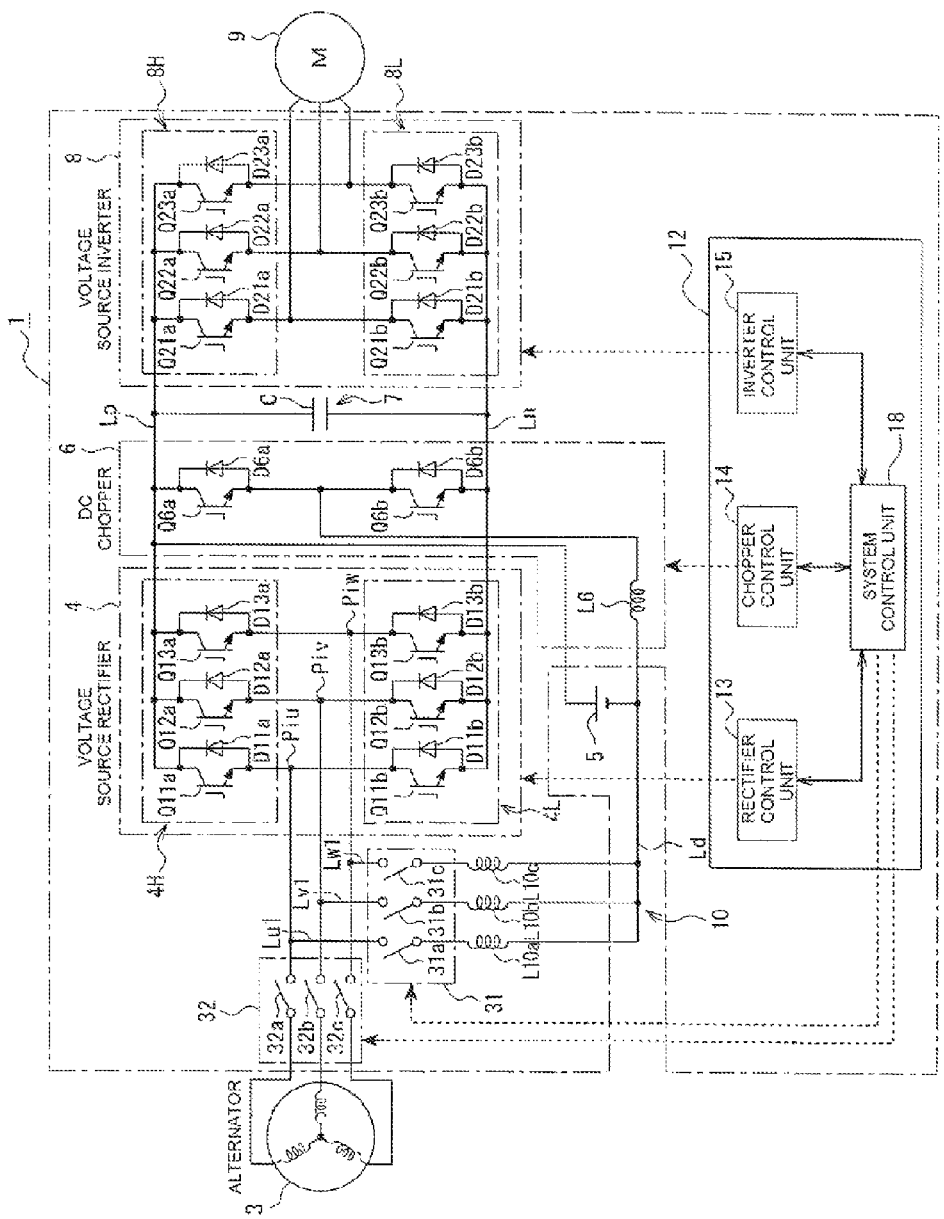
FIG. 10 is a circuit diagram showing a modification of the third embodiment.

The third embodiment has described a configuration in which the reactor L6 is connected to the positive-electrode side of the battery 5; however, not only this configuration but also the configuration shown in FIG. 10 is applicable as well. In other words, the same operational effects as those described in the first embodiment can be obtained by inserting the step-up/down reactor L6 between the negative-electrode side of the battery 5 and the connection point between the switching elements Q6a and Q6b to configure a series circuit, and connecting the positive-electrode side of the battery 5 to the positive electrode line Lp. In this case, one end of the DC power supply line Ld is connected to the connection point between the negative-electrode side of the battery 5 and the step-up/down reactor L6.

As with the configuration shown in FIG. 9, in the configuration shown in FIG. 10, when the voltage source rectifier 4 is used as a DC chopper, the alternator 3 is disconnected from the voltage source rectifier 4 by the second switch circuit 32, and the reactors L10a to L10c are provided with respect to the phases of the voltage source rectifier 4. Therefore, the step-up chopper control can be performed independently, for each phase, by the reactors L10a to L10c and each of the switching elements Q11b to Q13b of the lower arm part 4L of the voltage source rectifier 4. In this case as well, shifting the switching phases of the switching elements Q11b to Q13b can prevent the occurrence of a ripple in the DC output. One or more pairs can be selected from among a pair of switching elements Q11a and Q11b, a pair of switching elements Q12a and Q12b, and a pair of switching elements Q13a and Q13b in order to perform the step-up chopper operation, depending on the amount of current required.

Figure 11:
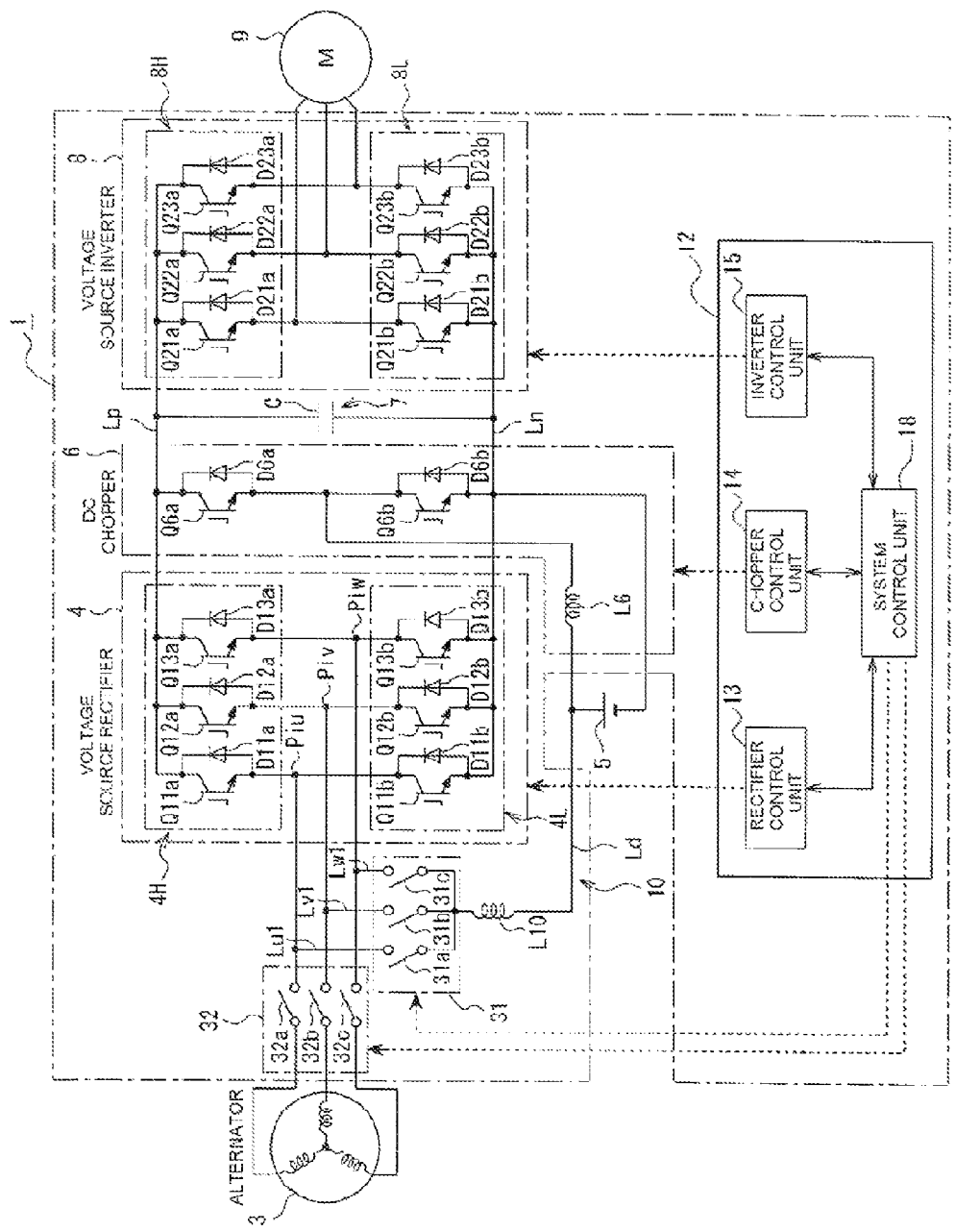
FIG. 11 is a circuit diagram showing another modification of the third embodiment.

The third embodiment has described a configuration in which the step-up/down reactors L10a to L10c are provided in accordance with the number of output phases of the alternator 3; however, the present invention is not limited thereto. As shown in FIG. 11, the switches 31a to 31c of the first switch circuit 31 on the step-up/down reactors L10a to L10c side may be connected to each other and then connected to the connection point between the battery 5 and the step-up/down reactor L6 via one of the step-up/down reactors L10.

Figure 12:
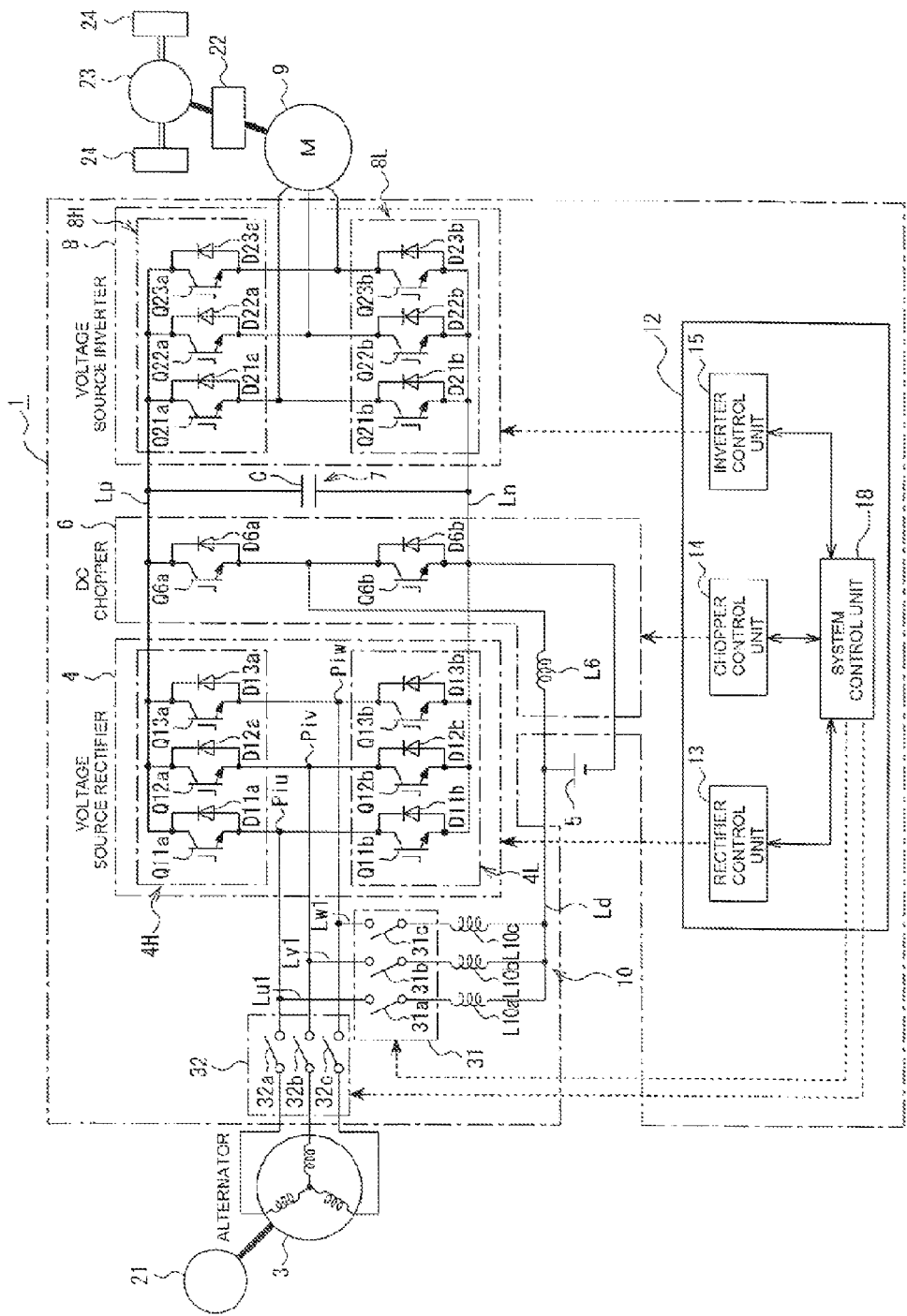
FIG. 12 is a circuit diagram showing yet another modification of the third embodiment.

In addition, when configuring a hybrid electric vehicle using the configuration described in the third embodiment, as shown in FIG. 12, while the alternator 3 is coupled to the internal combustion engine 21 or other type of engine to transmit the rotary drive force of the internal combustion engine 21 to the alternator 3, the output shaft of the AC motor 9 may be coupled to the differential gear 23 by the deceleration mechanism 22 according to need, and the right and left drive wheels 24 may be coupled to the differential gear 23. The internal combustion engine 21 and the AC motor 9 can be coupled to each other in the same manner as in FIG. 5.

A fourth embodiment is described next with reference to FIG. 13.

As with the second embodiment, in the fourth embodiment a dedicated DC power source is provided as the DC power source of the DC chopper configured by the reactors L10a to L10c and the voltage source rectifier 4.

Figure 13:
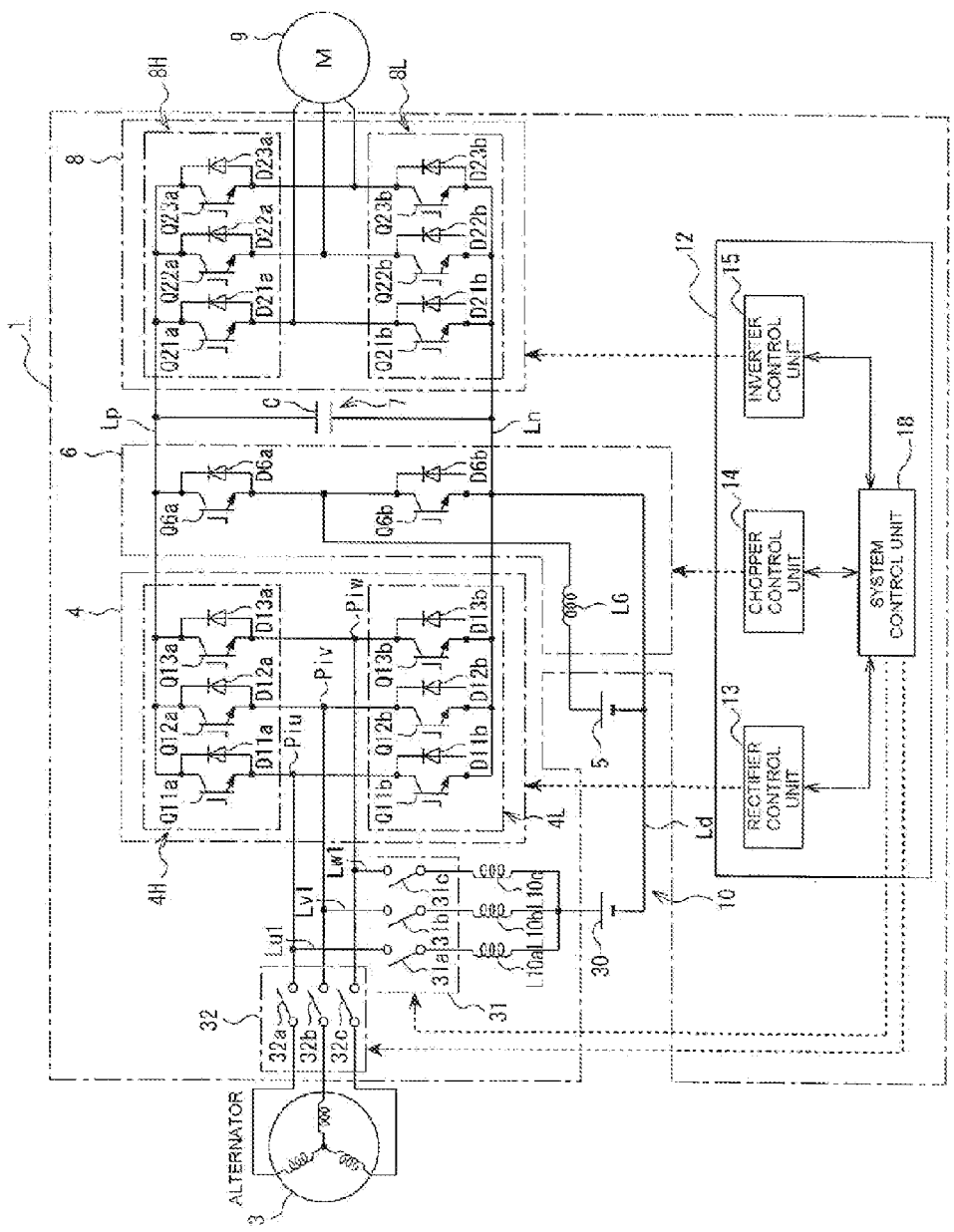
FIG. 13 is a circuit diagram showing a fourth embodiment of the present invention.

In the configuration of the third embodiment shown in FIG. 10, the fourth embodiment shown in FIG. 13 has a configuration in which ends on one side of the series circuit formed by the reactors L10a to L10c and the switches 31a to 31c are connected to each other, and then, between this resultant connection point and the negative-electrode side of the battery 5, the second battery 30 functioning as the dedicated second DC power source of the DC chopper circuit configured by the reactors L10a to L10c and the voltage source rectifier 4 is inserted.

According to the fourth embodiment, the battery voltage Vb of the battery 5 is boosted by the DC chopper 6 and then supplied to the voltage source inverter 8, and the battery voltage Vb2 of the battery 30 is boosted by the DC chopper circuit configured by the step-up/down reactors L10a to L10c and the voltage source rectifier 4 and then supplied to the voltage source inverter 8.

Therefore, the same operational effects as those described in the second embodiment can be accomplished.

As with the configuration shown in FIG. 9, in the configuration shown in FIG. 13, when the voltage source rectifier 4 is used as a DC chopper, the alternator 3 is disconnected from the voltage source rectifier 4 by the second switch circuit 32, and the reactors L10a to L10c are provided with respect to the phases of the voltage source rectifier 4. Therefore, the step-up chopper control can be performed independently, for each phase, by the step-up/down reactors L10a to L10c and each of the switching elements Q11b to Q13b of the lower arm part 4L of the voltage source rectifier 4. In this case, shifting the switching phases of the switching elements Q11b to Q13b can prevent the occurrence of a ripple in the DC output. One or more pairs can be selected from among a pair of switching elements Q11a and Q11b, a pair of switching elements Q12a and Q12b, and a pair of switching elements Q13a and Q13b in order to perform the step-up chopper operation, depending on the amount of current required. Moreover, the battery 30 can be divided into three sections, and these sections can be connected individually to the reactors L10a to L10c.

Figure 14:
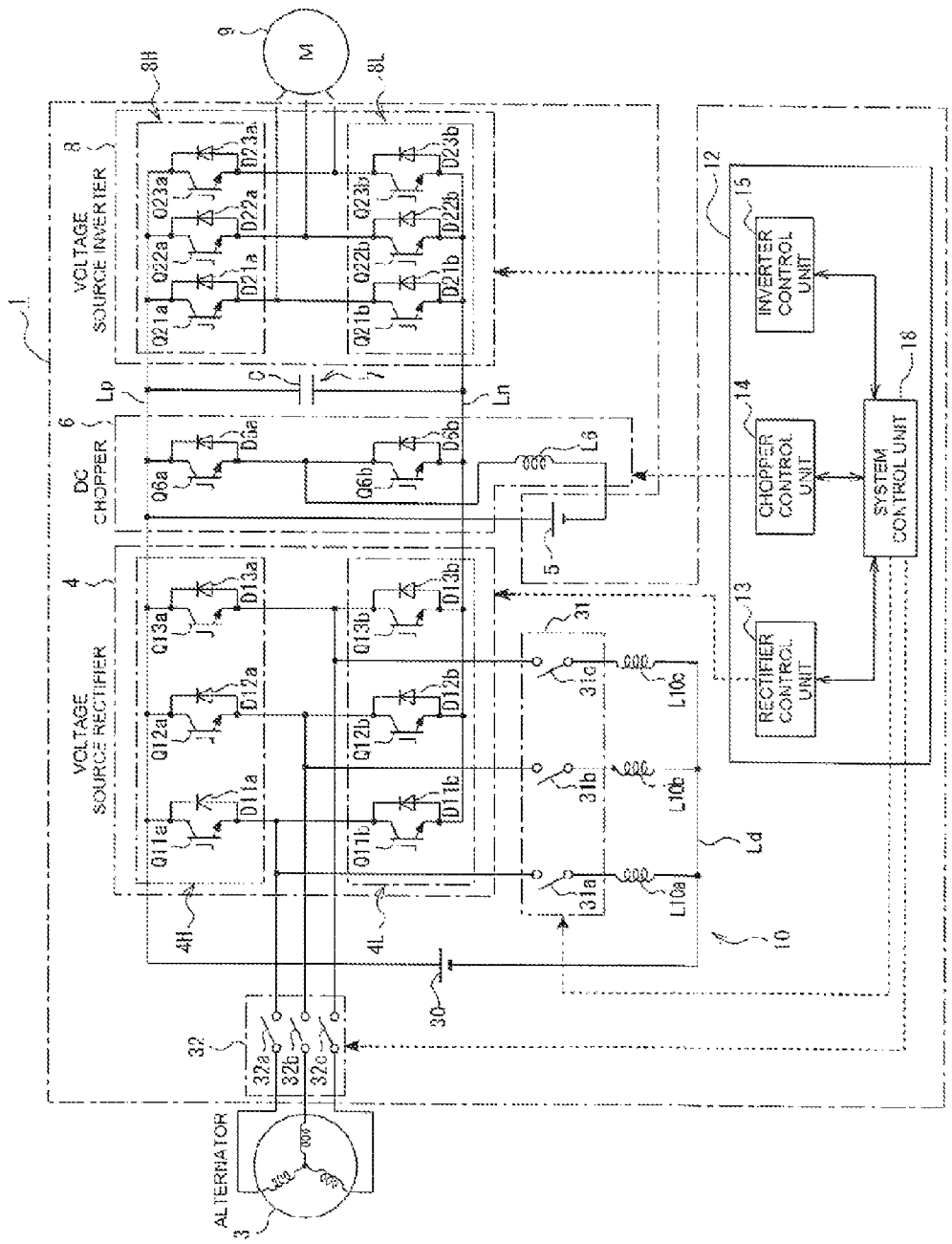
FIG. 14 is a circuit diagram showing a modification of the fourth embodiment.

In the fourth embodiment, the reactor L6 of the DC chopper 6 is connected serially to the positive-electrode side of the battery 5; however, the reactor L6 can be connected serially to the negative-electrode side of the battery 5 as well, as shown in FIG. 14. In this case, the connection of the DC chopper 6 is same as the connections shown in FIGS. 3 and 10 in which the reactor L6 is inserted between the negative-electrode side of the battery 5 and the connection point between the switching elements Q6a and Q6b to configure a series circuit, and the positive-electrode side of the battery 5 is connected to the positive electrode line Lp.

The second battery 30 may be disconnected from the battery 5 and the positive-electrode side of the second battery 30 may be directly connected to the positive electrode line Ln.

As with the configuration shown in FIG. 9, in the configuration shown in FIG. 14, when the voltage source rectifier 4 is used as a DC chopper, the alternator 3 is disconnected from the voltage source rectifier 4 by the second switch circuit 32, and the reactors L10a to L10c are provided with respect to the phases of the voltage source rectifier 4. Therefore, the step-up chopper control can be performed independently, for each phase, by the reactors L10a to L10c and each of the switching elements Q11b to Q13b of the lower arm part 4L of the voltage source rectifier 4. In this case, shifting the switching phases of the switching elements Q11b to Q13b can prevent the occurrence of a ripple in the DC output. One or more pairs can be selected from among a pair of switching elements Q11a and Q11b, a pair of switching elements Q12a and Q12b, and a pair of switching elements Q13a and Q13b in order to perform the step-up chopper operation, depending on the amount of current required.

Figure 15:
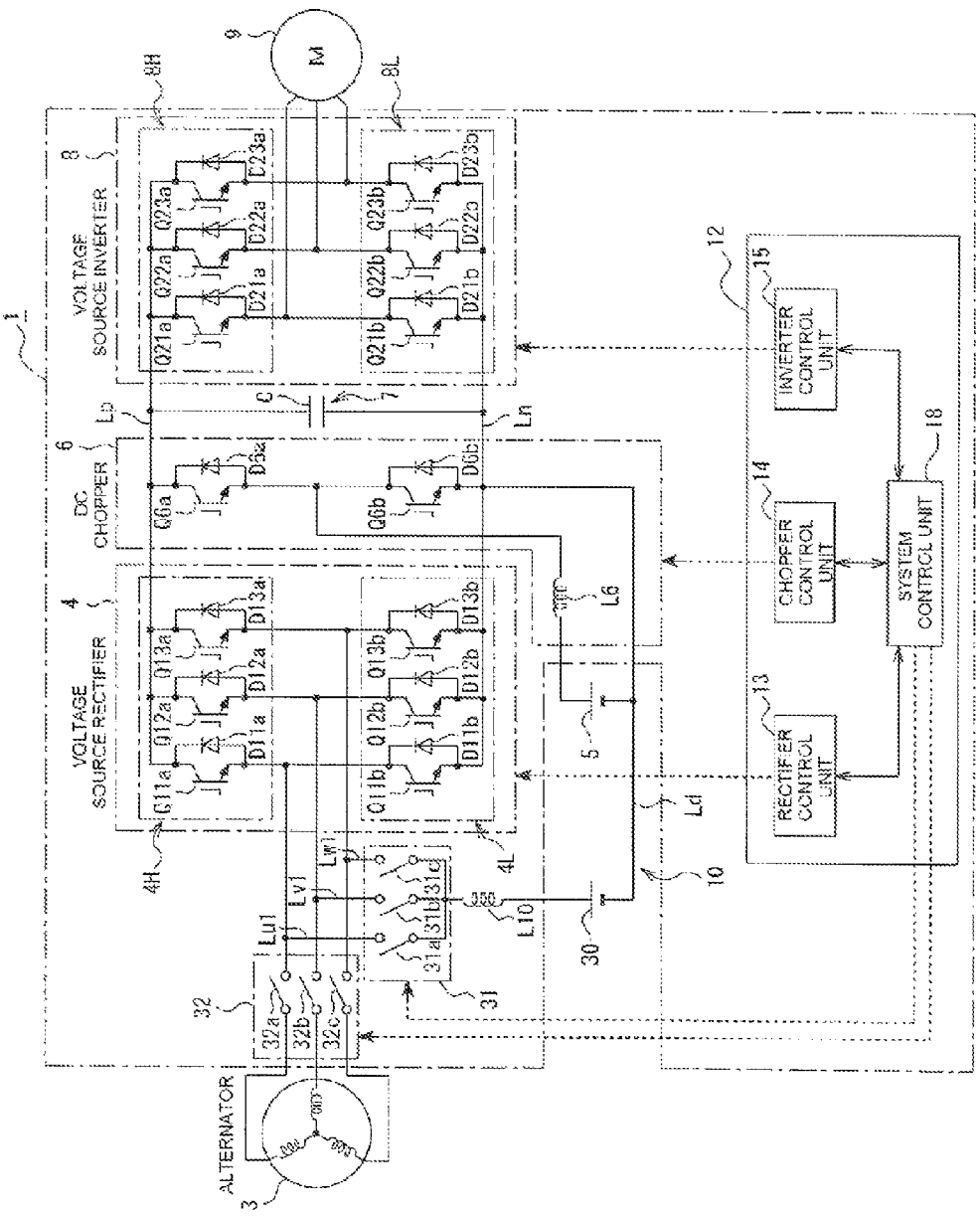
FIG. 15 is a circuit diagram showing yet another modification of the fourth embodiment.

The fourth embodiment has described a configuration in which the three reactors L10a to L10c are applied; however, the present invention is not limited thereto. As shown in FIG. 15, the switches 31a to 31c of the first switch circuit 31 on the reactor side may be connected to each other, and then, between this resultant connection point and the second battery 30, one of the reactors L10 may be connected. Simply providing one of the reactors L10 in this manner can simplify the structures of the reactors and the control circuit for performing the chopper control.

Figure 16:
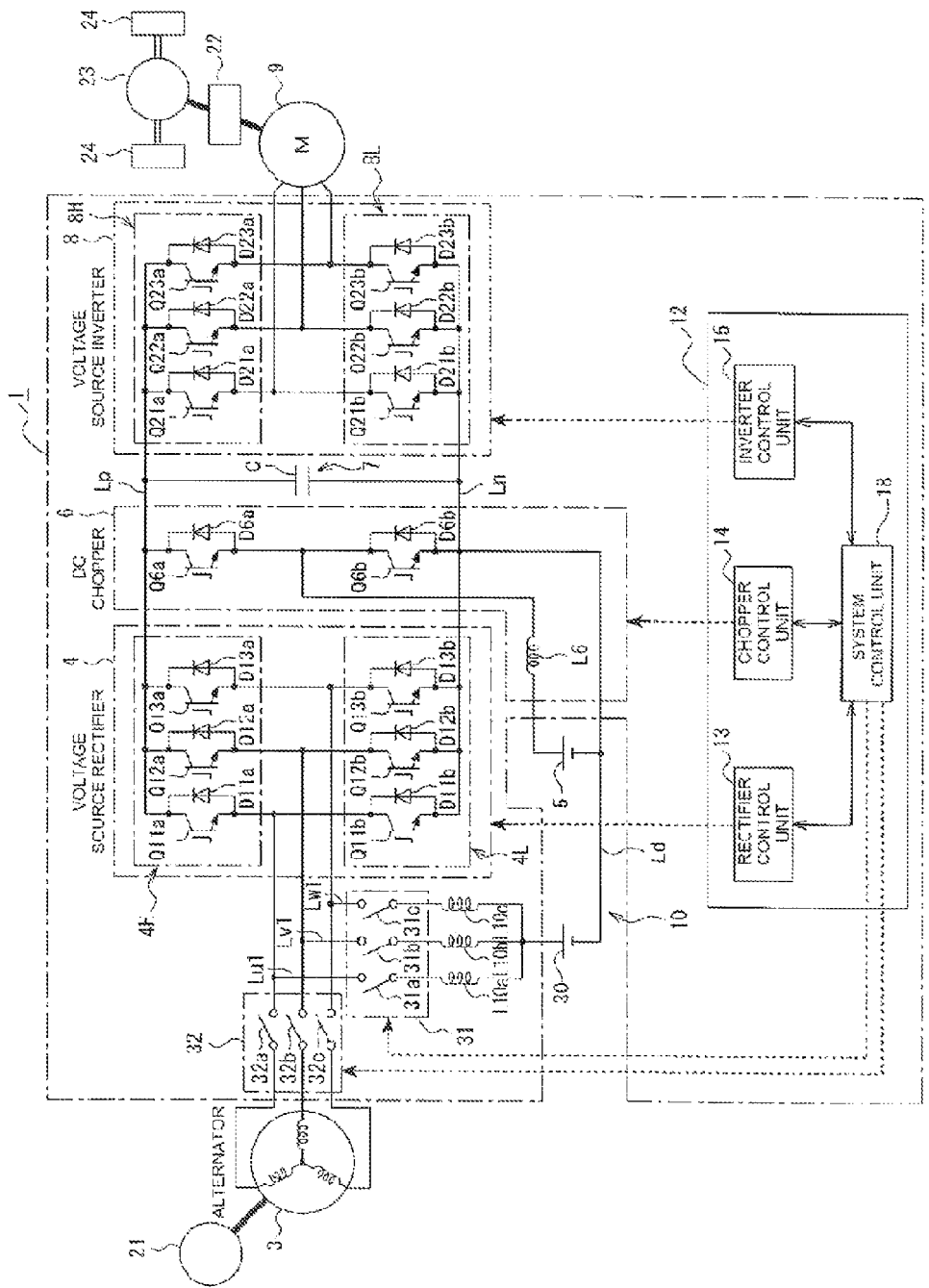
FIG. 16 is a circuit diagram showing yet another modification of the fourth embodiment.

In addition, when configuring a hybrid electric vehicle using the configuration described in the fourth embodiment, as shown in FIG. 16, while the alternator 3 is coupled to the internal combustion engine 21 or other type of engine to transmit the rotary drive force of the internal combustion engine 21 to the alternator 3, the output shaft of the AC motor 9 may be coupled to the differential gear 23 by the deceleration mechanism 22 according to need, and the right and left drive wheels 24 may be coupled to the differential gear 23. The internal combustion engine 21 and the AC motor 9 can be coupled to each other in the same manner as in FIG. 5.

A fifth embodiment of the present invention is described next with reference to FIG. 17.

In the fifth embodiment, the reactors are shared to reduce the size of the switching elements Q6a and Q6b of the DC chopper 6.

Figure 17:
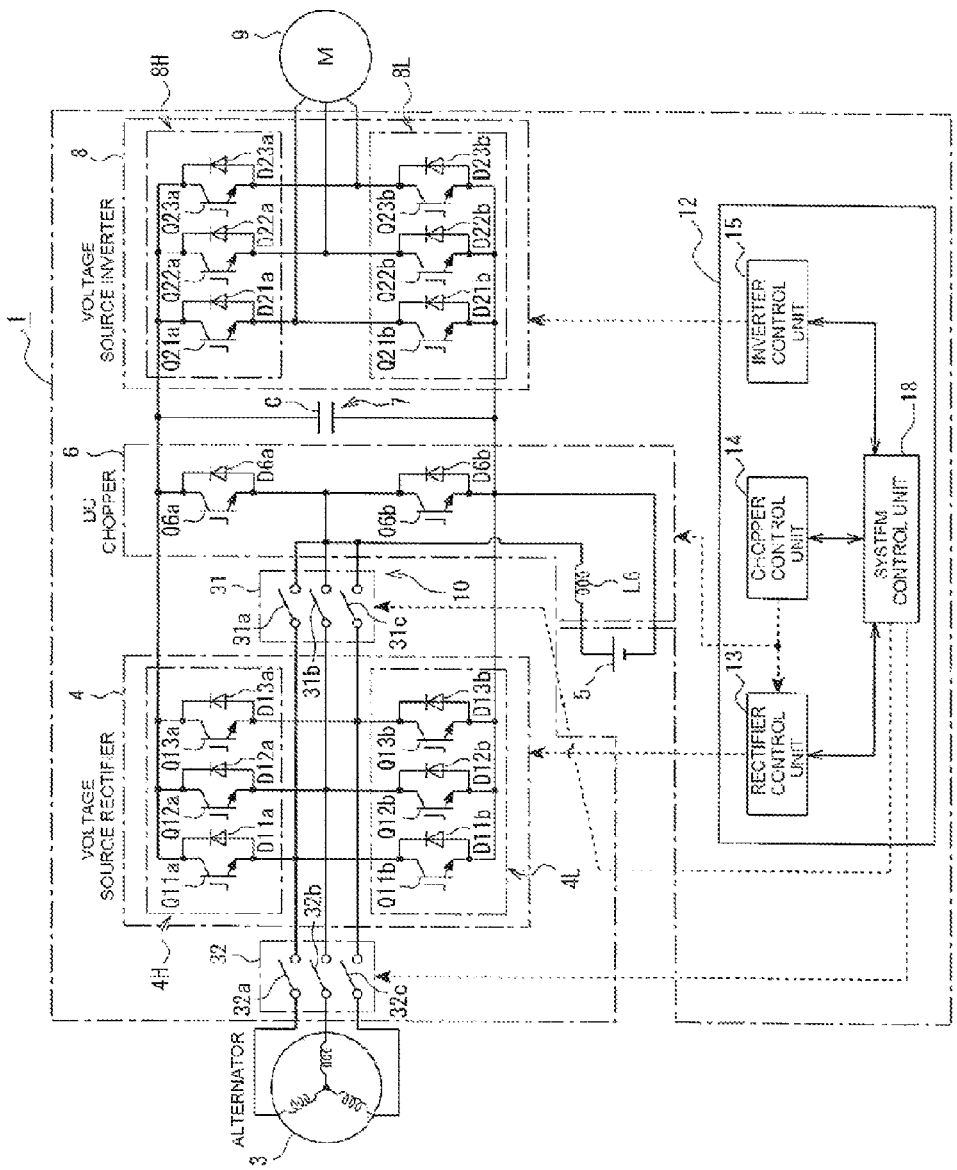
FIG. 17 is a block diagram showing a fifth embodiment of the present invention.

In other words, in the fifth embodiment shown in FIG. 17, the DC power supply path 10 into which is inserted the series circuit formed by the first switch circuit 31 described in the third embodiment shown in FIG. 9 and the reactors L10a to L10c is omitted. The DC power supply path 10 is formed between the reactor L6 of the DC chopper 6 and the connection point between the switching elements Q6a and Q6b, as well as between the AC input points Piu to Piw of the voltage source rectifier 4. The first switch circuit 31 with the switches 31a to 31c is inserted in this DC power supply path 10, the switches 31a to 31c having ends thereof connected to the AC input points Piu to Piw of the voltage source rectifier 4 respectively. The number of switches 31a to 31c is equivalent to the number of phases of the alternator 3. The switches 31a to 31c on the other side of the AC input points Piu to Piw are connected to each other between the reactor L6 and the connection point between the switching elements Q6a and Q6b.

Figure 18:
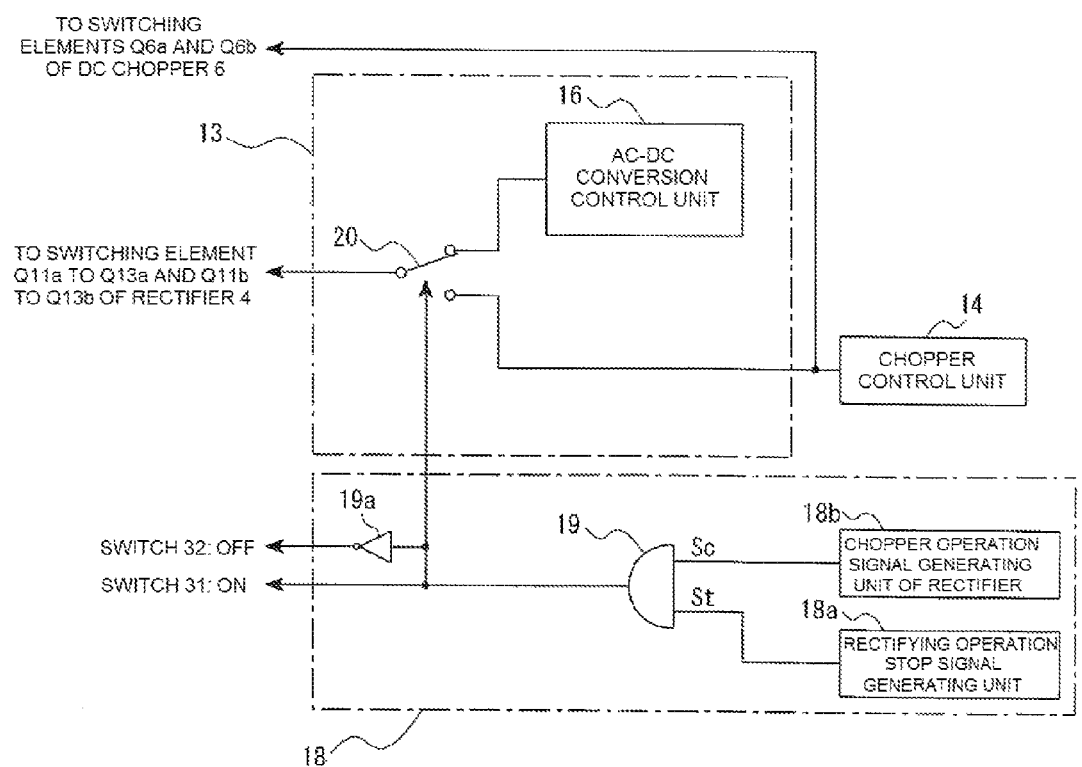
FIG. 18 is a block diagram showing a specific configuration of a rectifier control unit of a controller according to the fifth embodiment.

In the controller 12, the gate signal that is output from the chopper control unit 14 is supplied to the rectifier control unit 13, as shown in FIG. 17. As shown in FIG. 18, the DC-DC conversion control unit 17 described in the configuration of the first embodiment shown in FIG. 2 is omitted from the rectifier control unit 13. The configuration of the rectifier control unit 13 is same as the one shown in FIG. 2, except that the gate signal that is input from the chopper control unit 14 is supplied directly to a fixed contact point of the selecting switch 20. Thus, the same reference numerals are applied to the same parts corresponding to the ones shown in FIG. 2, and the detailed descriptions thereof are omitted. The configuration of the system control unit 18 is same as the one shown in FIG. 2, except that the output of the AND circuit 19 is supplied to the first switch circuit 31 directly and to the second switch circuit 32 via an inverting logic circuit 19a. Thus, the same reference numerals are applied to the same parts corresponding to the ones shown in FIG. 2, and the detailed descriptions thereof are omitted.

According to the fifth embodiment, during the operation of the alternator 3, the logical value of the output of the AND circuit 19 in the system control unit 18 is "0." The switches 31a to 31c of the first switch circuit 31 are turned off, and the switches 32a to 32c of the second switch circuit 32 are turned on. Thus, as with the first to fourth embodiments described above, the AC power generated by the alternator 3 is rectified by the voltage source rectifier 4, converted into DC power, and then supplied to the voltage source inverter 8. Then, three-phase AC power that corresponds to the motor torque required by the AC motor 9 is formed by the voltage source inverter 8 and supplied to the AC motor 9, whereby the AC motor 9 is driven to rotate.

In the regenerative braking state of the AC motor 9, on the other hand, the voltage source inverter 8 is operated as a rectifier by the inverter control unit 15, and converts the AC power that is input from the AC motor 9 into DC power. When reducing the conduction current of the switching elements of the DC chopper 6 in such a case, the system control unit 18 of the controller 12 sets the chopper operation signal Sc and the rectifying operation stop signal St to "1." As a result, the logical value of the output of the AND circuit 19 becomes "1." Consequently, the switches 31a to 31c of the first switch circuit 31 are turned on, and the switches 32a to 32c of the second switch circuit 32 are turned off. At the same time, the selecting switch 20 selects the chopper control gate signal that is input from the chopper control unit 14. This chopper control gate drive signal is supplied to the gate of each of the switching elements Q11a to Q13a of the upper arm part 4H of the voltage source rectifier 4 and the gate of each of the switching elements Q11b to Q13b of the lower arm part 4L simultaneously.

In this regenerative braking state, for example, the chopper control unit 14 outputs the gate signal for turning off the switching element Q6b of the DC chopper 6 and the switching elements Q11b to Q13b of the lower arm part 4L of the voltage source rectifier 4 and the gate signal for simultaneously turning on/off the switching element Q6a of the DC chopper 6 and the switching elements Q11a to Q13a of the upper arm part 4H of the voltage source rectifier 4. As a result, the step-down chopper control is carried by both the voltage source rectifier 4 and the DC chopper 6 to lower the voltage of the DC power that is output from the voltage source inverter 8 to the level of the charging voltage of the battery 5. In this manner, the battery 5 is charged.

Moreover, when causing the voltage source rectifier 4 to perform the chopper operation to drive the AC motor 9 while the alternator 3 is stopped, the chopper operation signal Sc and the rectifying operation stop signal St are set at "1," whereby the logical value of the output of the AND circuit 19 in the system control unit 18 becomes "1." Consequently, the switches 31a to 31c of the first switch circuit 31 are turned on, and the switches 32a to 32c of the second switch circuit 32 are turned off. In addition, the selecting switch 20 of the rectifier control unit 13 selects the gate signal output from the chopper control unit 14.

At the same time, the step-up choler control gate drive signal is output from the chopper control unit 14. This gate drive signal is simultaneously supplied directly to the gates of the switching elements Q6a and Q6b of the DC chopper 6, and to the gate of each of the switching elements Q11a to Q13a of the upper arm part 4H of the voltage source rectifier 4 and the gate of each of the switching elements Q11b to Q13b of the lower arm part 4L via the selecting switch 20.

Therefore, the step-up chopper control is performed by simultaneously turning on/off the switching element Q6b of the DC chopper 6 and the switching elements Q11b to Q13b of the lower arm part 4L of the voltage source rectifier 4, while turning off the switching element Q6a of the DC chopper 6 and the switching elements Q11a to Q13a of the upper arm part 4H of the voltage source rectifier 4. As a result, the battery voltage Vb of the battery 5 is boosted by the DC chopper 6 and the voltage source rectifier 4 and then supplied to the voltage source inverter 8. By turning on/off the switching elements Q21a to Q23a and Q21b to Q23b of the voltage source inverter 8 in accordance with the motor torque required in the inverter control unit 15 of the controller 12, the DC power is converted to AC power, which is then supplied to the AC motor 9 to drive the AC motor 9.

In the fifth embodiment as well, because the DC power of the battery 5 is subjected to the chopper control by the two switching units, i.e., the DC chopper 6 and the voltage source rectifier 4, the conduction current of each of the switching elements of the DC chopper 6 can be inhibited, reducing the size of the DC chopper 6. In the case of not inhibiting the conduction current of the DC chopper 6, the amount of current supplied to the voltage source inverter 8 can be increased in order to drive the motor with a higher motor torque.

Furthermore, sharing the reactor L6 can simplify the configuration of the reactor L6 and the configuration of the rectifier control unit 13 of the controller 12 for performing the chopper control.

Figure 19:
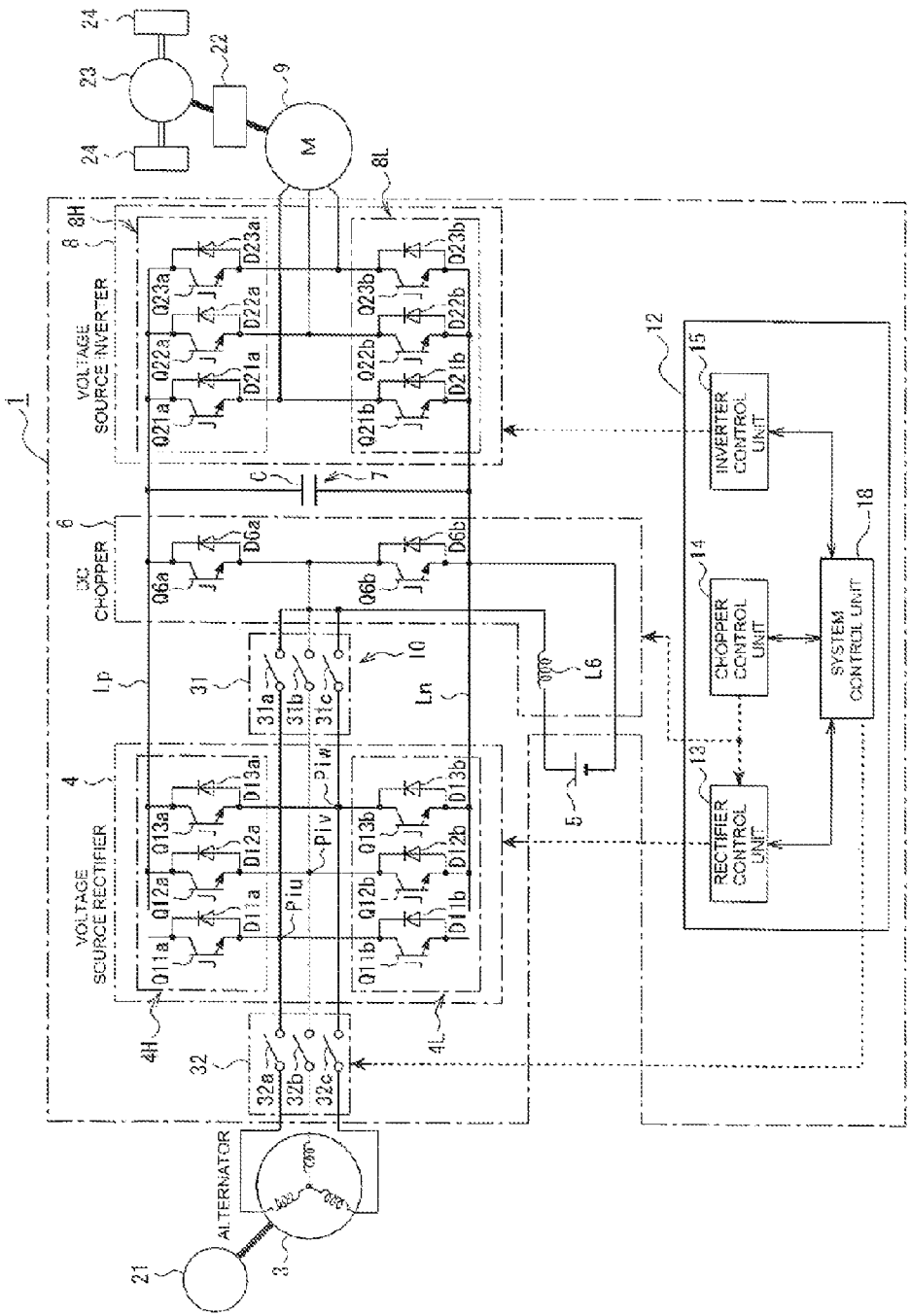
FIG. 19 is a circuit diagram showing a modification of the fifth embodiment.

When configuring a hybrid electric vehicle using the configuration described in the fifth embodiment, as shown in FIG. 19, while the alternator 3 is coupled to the internal combustion engine 21 or other type of engine to transmit the rotary drive force of the internal combustion engine 21 to the alternator 3, the output shaft of the AC motor 9 may be coupled to the differential gear 23 by the deceleration mechanism 22 according to need, and the right and left drive wheels 24 may be coupled to the differential gear 23. The internal combustion engine 21 and the AC motor 9 can be coupled to each other in the same manner as in FIG. 5.

The first to fifth embodiments have described the examples in which the voltage source rectifier is used as a two-level conversion circuit, but a multi-level conversion circuit can also be applied as the voltage source rectifier of each of the embodiments.

Figure 20:
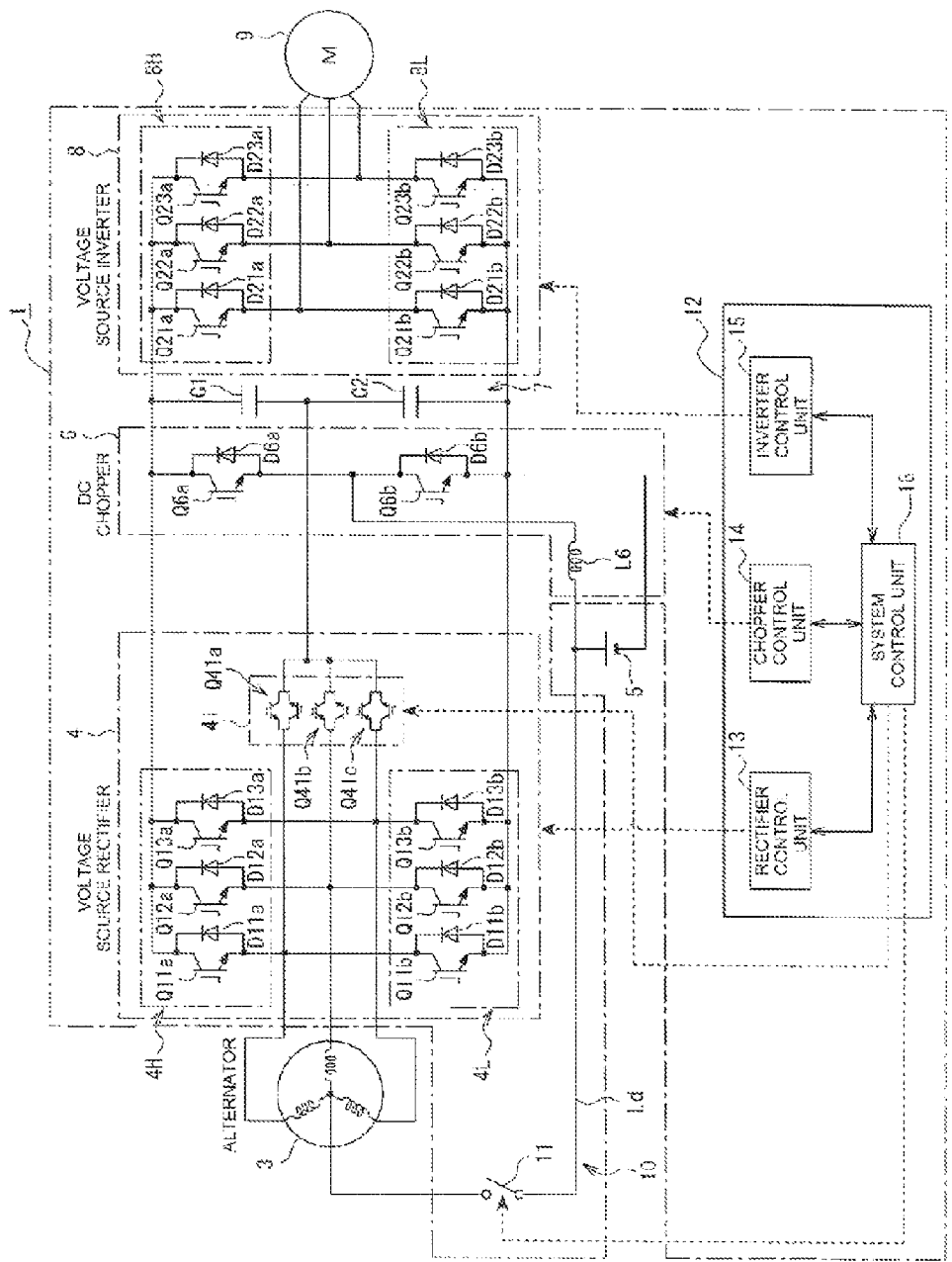
FIG. 20 is a circuit diagram showing a sixth embodiment of the present invention.

In other words, as shown in a circuit diagram of FIG. 20 of a sixth embodiment where a three-level voltage source rectifier is applied as the voltage source rectifier 4, the capacitor C described in the configuration of the first embodiment shown in FIG. 1, for example, is divided into two capacitors C1, C2 to configure a series connection circuit. Bidirectional switching elements 41a to 41c of a switch circuit 41 are individually connected between a connection point between these capacitors C1 and C2 and the AC input points Piu to Piw of the voltage source rectifier 4.

Figure 21A:
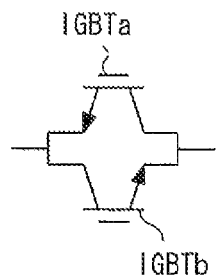
FIG. 21 is a diagram showing switches applicable to the sixth embodiment.
Figure 21B:
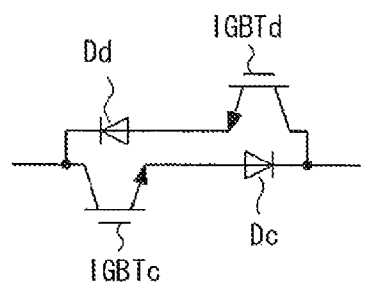
Figure 21C:
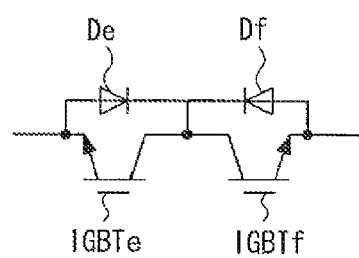

The following connections can be applied as the bidirectional switching elements Q41a to Q41c: a combination of inverse-parallel connected IGBTa and IGBTb having reverse blocking capability as shown in FIG. 21(a); a serially connected group of an IGBTc, IGBTd, and diodes Dc and Dd that have no reverse blocking capability as shown in FIG. 21(b); and a combination shown in FIG. 21(c) in which collectors of IGBTe and IGBTf having no reverse blocking capability are connected to each other, anodes of diodes De and Df are connected to each other in parallel with the IGBTe and IGBTf, and then the connection point between the IGBTe and IGBTf is connected to the connection point between the diodes De and Df.

The sixth embodiment has described an example in which the three-level voltage source rectifier is applied to the first embodiment; however the present invention is not limited thereto, and the three-level voltage source rectifier can be applied to the second to fourth embodiments as well.

Figure 22:
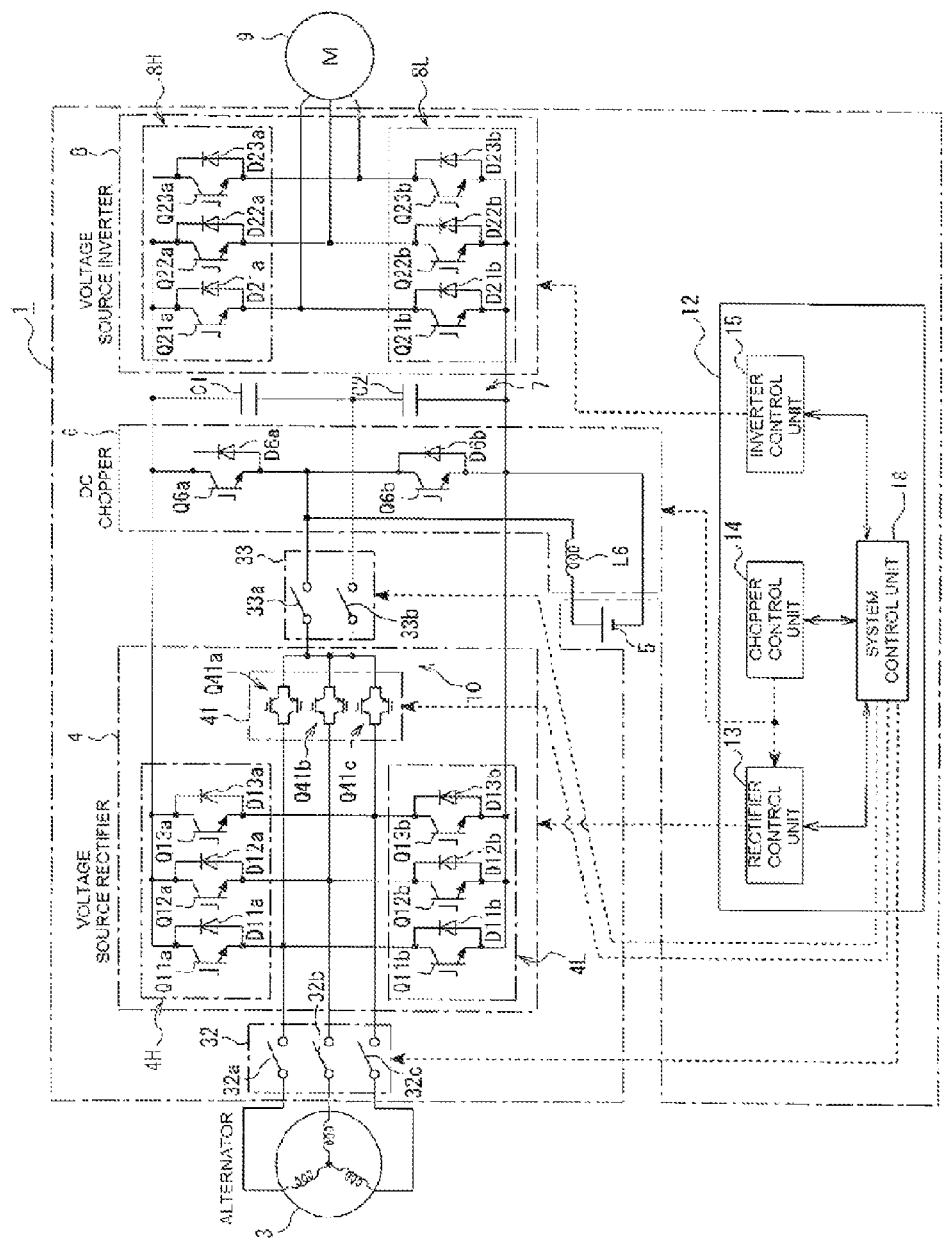
FIG. 22 is a circuit diagram showing a seventh embodiment of the present invention.

FIG. 22 is a circuit diagram showing a seventh embodiment in which the three-level voltage source rectifier is applied to the fifth embodiment shown in FIG. 17. In the seventh embodiment, the functions of the switches 31a to 31c of the first switch circuit 31 can partially be used in the bidirectional switching elements Q41a to Q41c of the three-level voltage source rectifier.

In other words, as shown in FIG. 22, one end of each of the bidirectional switch elements Q41a to Q41c is connected to each of the AC input points Piu to Piw of the voltage source rectifier 4, and the other ends of the bidirectional switch elements Q41a to Q41c are connected to each other and then to a third switch circuit 33. This third switch circuit 33 has switches 33a, 33b. One end of each of the switches 33a, 33b is connected to the other ends of the bidirectional switching elements Q41a to Q41c. The other end of the switch 33a is connected to the connection point between the switch elements Q6a and Q6b configuring the DC chopper 6. The other end of the switch 33b is connected to the connection point between the capacitors C1 and C2 that are obtained by dividing the capacitor C in two sections.

The three-level voltage source rectifier is configured by the circuit configured by the switching elements Q11a to Q13a and the diodes D11a to D13a that are connected to the switching elements Q11a to Q13a respectively in inverse parallel, the circuit configured by the switching elements Q11b to Q13b and the diodes D11b to D13b that are connected to the switching elements Q11b to Q13b respectively in inverse parallel, and the circuit of the bidirectional switching elements Q41a to Q41c.

According to the seventh embodiment, when the alternator 3 is driven by the internal combustion engine or other type of engine, the logical value of the rectifying operation stop signal St of the system control unit 18 and the logical value of the output of the AND circuit 19 are "0." Therefore, the selecting switch 20 selects the output of the AC-DC conversion control unit 16, and, accordingly, the gate drive signal formed by the AC-DC conversion control unit 16 is output to each of the switching elements Q11a to Q13a, Q11b to Q13b, and Q41a to Q41c of the voltage source rectifier 4. At this moment, the switch 33a is opened, but the switch 33b is closed.

Therefore, the rectifying operation is performed by the three-level voltage source rectifier 4, whereby the AC power that is output from the alternator 3 is converted into DC power, which is then smoothed by the smoothing capacitors C1, C2, and supplied to the voltage source inverter 8.

When driving the AC motor 9 and causing the rectifier to perform the chopper operation in the stopped state of the alternator 3, the system control unit 18 of the controller 12 turns on the two directions of the bidirectional switching elements Q41a to 41c, turns on the switch 33a, and turns off the switch 33b. This operation is same as the one shown in FIG. 17 in which the switches 31a to 31c are turned on.

Furthermore, the switches 32a to 32c of the second switch circuit 32 are turned off.

The other operations are same as those shown in FIG. 17 in which the chopper control unit 14 forms the step-up chopper control gate drive signal, which is supplied directly to the gates of the switching elements Q6a and Q6b of the DC chopper 6, and then supplied simultaneously to the gate of each of the switching elements Q11a to Q13a of the upper arm part 4H of the voltage source rectifier 4 and the gate of each of the switching elements Q11b to Q13b of the lower arm part 4L, via the selecting switch 20.

Therefore, the step-up chopper control is performed by simultaneously turning on/off the switching element Q6b of the DC chopper 6 and the switching elements Q11b to Q13b of the lower arm part 4L of the voltage source rectifier 4, while, for example, turning off the switching element Q6a of the DC chopper 6 and the switching elements Q11a to Q13a of the upper arm part 4H of the voltage source rectifier 4. As a result, the battery voltage Vb of the battery 5 is boosted by the DC chopper 6 and the voltage source rectifier 4 and then supplied to the voltage source inverter 8. By turning on/off the switching elements Q21a to Q23a and Q21b to Q23b of the voltage source inverter 8 in accordance with the motor torque required by the inverter control unit 15 of the controller 12, the DC power is converted into AC power, which is then supplied to the AC motor 9 to drive the AC motor 9.

The first to seventh embodiments have described the examples in which the battery is applied as the DC power source, but a charging capacitor can also be applied as the DC power source.

The first to seventh embodiments have also described the examples in which the alternator 3 is applied as the AC power source, but a commercial AC power source can also be applied as the AC power source.

The first to seventh embodiments have also described the examples in which the two-level inverter is applied as the voltage source inverter 8, but the present invention is not limited thereto, and a multi-level inverter with three or more voltage levels can also be applied as the voltage source inverter 8.

The first to seventh embodiments have also described the examples in which the reactor is applied as the inductance element, but the present invention is not limited thereto, and any inductance element that uses an inductance component of a bus bar or other wire can also be applied as the inductance element.

The first to seventh embodiments have also described the examples in which insulated gate bipolar transistors (IGBT) are used as the switching elements of the voltage source rectifier 4, the DC chopper 6, and the voltage source inverter 8, but the present invention is not limited thereto, and any voltage-controlled switching element such as a power MOSFET can also be applied as each of these switching elements.

The first to seventh embodiments have also described the examples in which the present invention is applied to a hybrid electric vehicle, but the present invention is not limited thereto and can also be applied to any load drive device that drives an AC load.

The first to seventh embodiments have also described the examples in which the alternator 3 and the AC motor 9 use three-phase AC, but the present invention is not limited thereto and a multi-phase AC with four or more phases can be used as in a brushless motor.

INDUSTRIAL APPLICABILITY

The present invention described above is capable of supplying a current, which is required by a load, from the DC power source, by using the voltage source rectifier as a DC chopper when the alternator is stopped, the voltage source rectifier being used for converting AC power generated by the alternator into DC power, even when the AC power cannot be obtained. The present invention can be applied to a hybrid vehicle or any load drive device that drives an AC load.

EXPLANATION OF REFERENCE NUMERALS

Figure 23:
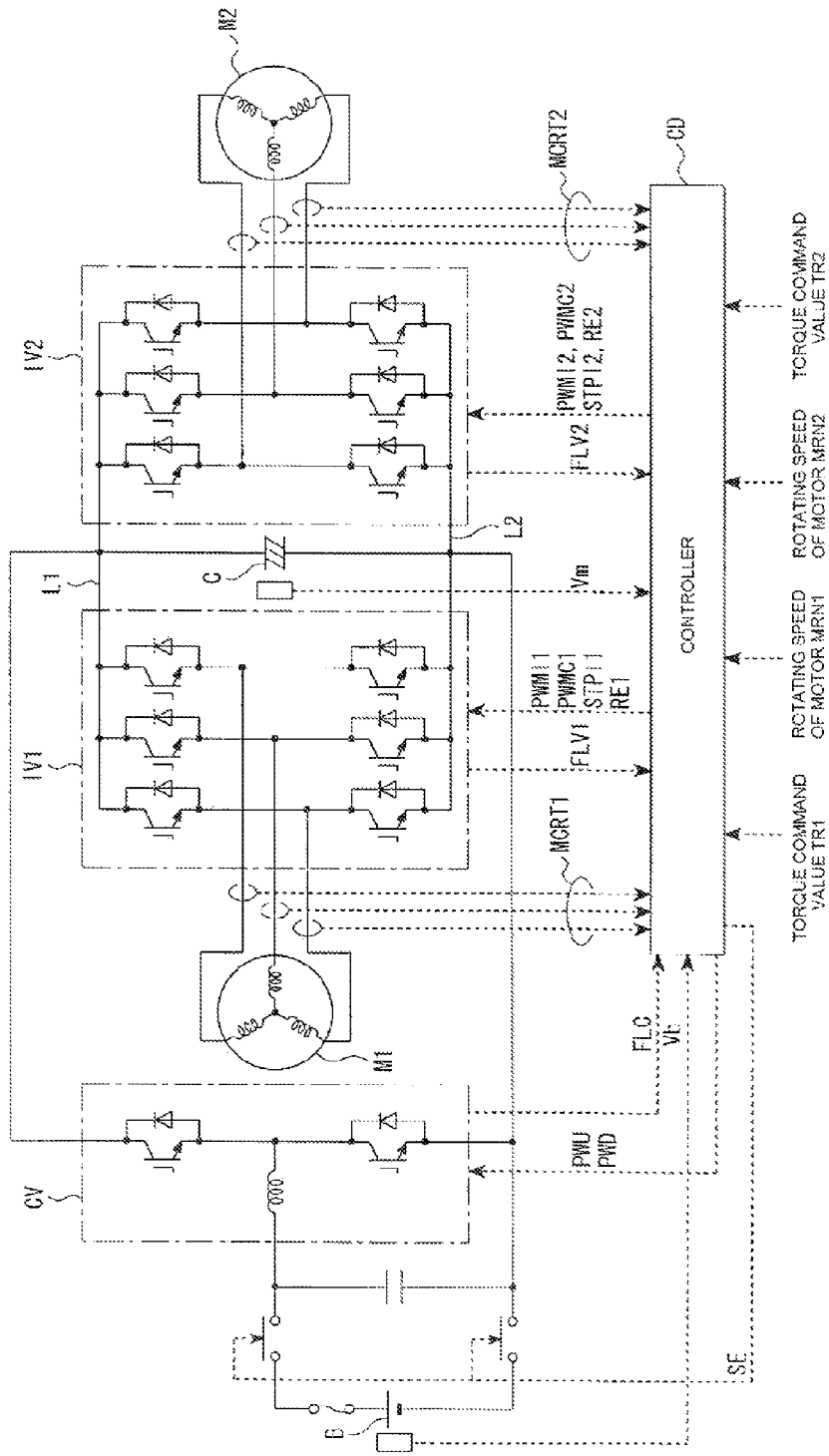
FIG. 23 is a circuit diagram showing a conventional power converter.

1 Power converter
3 Alternator
4 Voltage source rectifier
5 Battery
6 DC chopper
Q6a, Q6b Switching element
L6 Step-up/down reactor
7 DC unit
C Smoothing capacitor
8 voltage source inverter
9 AC motor
10 DC power supply path
Ld DC power supply line
11 Switch circuit
L10 Reactor
12 Controller
13 Rectifier control unit
14 Chopper control unit
15 Inverter control unit
16 AC-DC conversion control unit
17 DC-DC conversion control unit
18 System control unit
19 AND circuit
20 Selecting switch
30 Second battery
31 First switch circuit
31a to 31c Switch
32 Second switch circuit
32a to 32c Switch
41 Switch circuit
Q41a to Q41c Bidirectional switching elements
  FIG. 1
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 2
16 AC-DC CONVERSION CONTROL UNIT
17 DC-DC CONVERSION CONTROL UNIT
TO SWITCHING ELEMENTS Q11a TO Q13a AND Q11b TO Q13b OF
RECTIFIER 4
SWITCH 11: ON
18b CHOPPER OPERATION SIGNAL GENERATING UNIT OF RECTIFIER
18a RECTIFYING OPERATION STOP SIGNAL GENERATING UNIT
  FIG. 3
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 4
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 5
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 6
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 7
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 8
2 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 9
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 10
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
  FIG. 11
4 VOLTAGE SOURCE RECTIFIER 6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 12
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 13
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 14
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 15
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 16
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 17
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 18
TO SWITCHING ELEMENTS Q6a AND Q6b OF DC CHOPPER 6
16 AC-DC CONVERSION CONTROL UNIT
TO SWITCHING ELEMENTS Q11a TO Q13a AND Q11b TO Q13b OF
RECTIFIER 4
14 CHOPPER CONTROL UNIT
SWITCH 32: OFF
SWITCH 31: ON
18b CHOPPER OPERATION SIGNAL GENERATING UNIT OF RECTIFIER
18a RECTIFYING OPERATION STOP SIGNAL GENERATING UNIT
   FIG. 19
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 20
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 22
4 VOLTAGE SOURCE RECTIFIER
6 DC CHOPPER
8 VOLTAGE SOURCE INVERTER
3 ALTERNATOR
13 RECTIFIER CONTROL UNIT
14 CHOPPER CONTROL UNIT
15 INVERTER CONTROL UNIT
18 SYSTEM CONTROL UNIT
   FIG. 23
40 CD CONTROLLER
TORQUE COMMAND VALUE TR1
ROTATING SPEED OF MOTOR MRN1
ROTATING SPEED OF MOTOR MRN2
TORQUE COMMAND VALUE TR2

The invention claimed is:
1. A power converter, comprising:
a voltage source rectifier converting AC power obtained from an AC power source into a DC power output;
a DC power source;
a DC voltage conversion circuit converting a DC voltage obtained from the DC power source into a different DC voltage and outputting a corresponding DC power; and
a load driving circuit converting at least either the DC power output of the voltage source rectifier or the DC power output of the DC voltage conversion circuit into AC power to drive an AC load,
wherein the DC power source is connected to the DC voltage conversion circuit to convert a voltage of the DC power source and supply a resultant voltage to the load driving circuit,
and wherein the DC power source is connected to the voltage source rectifier via a DC power supply circuit and inductance elements, and the voltage source rectifier is controlled as a DC chopper, to convert the voltage of the DC power source and supply a resultant voltage to the load driving circuit.

2. The power converter according to claim 1, wherein the AC power source is configured by an alternator, and the inductance elements are each configured by a winding wire of the alternator.

3. The power converter according to claim 2, wherein the DC power supply circuit has a configuration in which the DC power source and a neutral point of the winding wire of the alternator are connected by a switch circuit.

4. The power converter according to claim 3, wherein the switch circuit is controlled to be turned on when the alternator is in a stopped state thereof and the voltage source rectifier is controlled as the DC chopper.

5. The power converter according to claim 4, wherein the DC power supply circuit has an auxiliary inductance element inserted thereto in series with the switch circuit.

6. The power converter according to claim 2, wherein the DC power supply circuit has a second DC power source that is different from the DC power source and is connected in series with the switch circuit.

7. The power converter according to claim 1,
wherein a switch circuit is provided to connect each of phases of AC input parts of the voltage source rectifier to the AC power source,
and wherein one end of the DC power supply circuit is connected between the switch circuit and each of the phases of the AC input parts of the voltage source rectifier, while another end of the DC power supply circuit is connected to the DC power source by the inductance elements.

8. The power converter according to claim 7, wherein the DC power supply circuit has another switch circuit that is connected to each of the phases of the AC input parts of the voltage source rectifier and connected in series with the inductance elements.

9. The power converter according to claim 8,
wherein the switch circuit is turned off to disconnect the voltage source rectifier from the AC power source, and the other switch circuit is turned on to connect the DC power source between the switch circuit and each of the phases of the AC input parts of the voltage source rectifier by each inductance element,
and wherein the voltage source rectifier is controlled as the DC chopper to convert the voltage of the DC power source and supply the resultant voltage to the load driving circuit.

10. The power converter according to claim 8, wherein the inductance elements are connected in series with the other switch circuit.

11. The power converter according to claim 8, wherein the inductance elements are connected individually in series with the other switch circuit.

12. The power converter according to claim 8, wherein the DC power supply circuit has a second DC power source that is different from the DC power source and is connected in series with the other switch circuit.

13. The power converter according to claim 1,
wherein a switch circuit is provided to connect each of phases of AC input parts of the voltage source rectifier to the AC power source,
and wherein the DC power supply circuit is connected between each of the phases of the AC input parts of the voltage source rectifier and a serial connection point between switching elements configuring the DC voltage conversion circuit.

14. The power converter according to claim 13, wherein the DC power supply circuit has a configuration in which each of the phases of the AC input parts of the voltage source rectifier is connected to the serial connection point between the switching elements configuring the DC voltage conversion circuit, by another switch circuit.

15. The power converter according to claim 1, wherein the load is an AC motor, and the load drive device is a voltage source inverter.

16. An apparatus comprising:
a rectifying device configured to convert an AC power input into a first DC power output;
a DC voltage conversion device configured to convert a DC voltage input into a second DC power output; and
a load driving device configured to convert at least one of the first DC power output or the second DC power output into an AC power output;
wherein the rectifying device is operable as a DC chopper.

17. The apparatus of claim 16, further comprising an AC power source configured to supply the AC power input and a DC power supply configured to supply the DC voltage input.

18. The apparatus of claim 17, further comprising a control device configured to output at least a first control signal to cause the rectifying device to operate as a rectifier that converts the AC power input into the first DC power output, and at least a second control signal to cause the rectifying device to operate as a step-up DC chopper.

19. The apparatus of claim 18, wherein the rectifying device is configured to, while operating as the step-up DC chopper, supplement a charging operation of the DC voltage conversion device to charge the DC power supply.

20. The apparatus of claim 19, further comprising a DC power supply path comprising a switch, controlled by the control device, connected between the AC power source and the DC power source, and an inductance element connected between the DC power source and the DC voltage conversion device.

* * * * *